(12) United States Patent
Wong et al.

(10) Patent No.: US 11,905,634 B2
(45) Date of Patent: Feb. 20, 2024

(54) FABRICATION OF NANOFIBERS AS DRY ADHESIVES AND APPLICATIONS OF THE SAME

(71) Applicants: Shing-Chung Josh Wong, Akron, OH (US); Johnny F. Najem, Okaibe (LB); Pei Chen, Beijing (CN)

(72) Inventors: Shing-Chung Josh Wong, Akron, OH (US); Johnny F. Najem, Okaibe (LB); Pei Chen, Beijing (CN)

(73) Assignee: THE UNIVERSITY OF AKRON, Akron, OH (US)

( * ) Notice: Subject to any disclaimer, the term of this patent is extended or adjusted under 35 U.S.C. 154(b) by 16 days.

(21) Appl. No.: 17/509,464

(22) Filed: Oct. 25, 2021

(65) Prior Publication Data

US 2022/0042224 A1    Feb. 10, 2022

Related U.S. Application Data

(63) Continuation of application No. 16/044,934, filed on Jul. 25, 2018, now Pat. No. 11,180,877, which is a
(Continued)

(51) Int. Cl.
*D04H 1/74* (2006.01)
*C09J 5/00* (2006.01)

(52) U.S. Cl.
CPC ............ *D04H 1/74* (2013.01); *C09J 5/00* (2013.01); *C09J 2301/31* (2020.08);
(Continued)

(58) Field of Classification Search
CPC . D04H 1/74; C09J 5/00; C09J 2301/31; C09J 2400/263; Y10T 428/24132; Y10T 29/49801; Y10T 29/53526
(Continued)

(56) References Cited

U.S. PATENT DOCUMENTS

| 3,562,804 A | 2/1971 | Powers |
| 6,872,439 B2 | 3/2005 | Fearing et al. |
(Continued)

FOREIGN PATENT DOCUMENTS

| WO | 2002034986 | 5/2002 | |
| WO | WO-03102099 A1 * | 12/2003 | ............... C09J 5/00 |
(Continued)

OTHER PUBLICATIONS

Shi, et al., Do Electrospun Polymer Fibers Stick, Langmuir, 2010, vol. 26(17), pp. 14188-14193.

*Primary Examiner* — Vincent Tatesure
(74) *Attorney, Agent, or Firm* — RENNER KENNER GREIVE BOBAK TAYLOR & WEBER

(57) ABSTRACT

A dry adhesive including a non-woven fabric of nanofibers comprising a polymeric material. The nanofibers include an average diameter within a range of from 50 nm to 10000 nm, and the non-woven fabric of nanofibers has a thickness within a range of from 0.1 μm to 100 μm. The dry adhesive has a shear adhesion strength that is higher than the normal adhesion strength. Additionally disclosed is a dry adhesive fiber mat including substantially aligned fibers extending lengthwise from a first region to a second region, each of the fibers having a diameter that is less than or equal to 10 microns. The dry adhesive fiber mat is selectively repositionable to, from, and between a mechanically interlocked state wherein the fibers at the first region are intimately positioned within void spaces between the fibers at the second region and a separated state not intimately positioned as such.

18 Claims, 18 Drawing Sheets

Related U.S. Application Data continuation of application No. 14/720,117, filed on May 22, 2015, now Pat. No. 10,081,891, which is a continuation-in-part of application No. 14/419,358, filed as application No. PCT/US2013/053807 on Aug. 6, 2013, now Pat. No. 9,511,528.

(60) Provisional application No. 62/015,570, filed on Jun. 23, 2014, provisional application No. 61/679,818, filed on Aug. 6, 2012.

(52) U.S. Cl.
CPC .... *C09J 2400/263* (2013.01); *Y10T 29/49801* (2015.01); *Y10T 29/53526* (2015.01); *Y10T 428/24132* (2015.01)

(58) Field of Classification Search
USPC .......................................................... 428/114
See application file for complete search history.

(56) References Cited

U.S. PATENT DOCUMENTS

| | | | |
|---|---|---|---|
| 7,479,198 B2 | 1/2009 | Guffrey et al. | |
| 8,142,700 B2 | 3/2012 | Sitti et al. | |
| 8,206,631 B1 | 6/2012 | Sitti et al. | |
| 8,398,909 B1 | 3/2013 | Sitti et al. | |
| 8,428,675 B2 | 4/2013 | Mckenna | |
| 9,120,953 B2 | 9/2015 | Sitti et al. | |
| 2003/0037675 A1 | 2/2003 | Gillingham et al. | |
| 2004/0013819 A1 | 1/2004 | Hou et al. | |
| 2004/0051201 A1 | 3/2004 | Greenhalgh et al. | |
| 2004/0203306 A1 | 10/2004 | Grafe et al. | |
| 2004/0206448 A1 | 10/2004 | Dubrow | |
| 2005/0271869 A1* | 12/2005 | Jackson | B32B 27/12 428/297.4 |
| 2006/0194496 A1 | 8/2006 | Burns et al. | |
| 2006/0260707 A1 | 11/2006 | Frey et al. | |
| 2007/0051465 A1 | 3/2007 | Naughton et al. | |
| 2007/0261458 A1 | 11/2007 | Oruganti et al. | |
| 2008/0280085 A1 | 11/2008 | Livne | |
| 2008/0292840 A1 | 11/2008 | Majumdar et al. | |
| 2009/0011232 A1 | 1/2009 | Dai et al. | |
| 2009/0253806 A1 | 10/2009 | Varshney et al. | |
| 2010/0086785 A1 | 4/2010 | Perry et al. | |
| 2010/0136281 A1 | 6/2010 | Sitti et al. | |
| 2010/0327494 A1 | 12/2010 | Jabbari | |
| 2011/0117321 A1 | 5/2011 | Menon et al. | |
| 2011/0236974 A1 | 9/2011 | Ogle et al. | |
| 2011/0259518 A1 | 10/2011 | Tojo et al. | |
| 2013/0197663 A1 | 8/2013 | Macewan et al. | |

FOREIGN PATENT DOCUMENTS

| | | |
|---|---|---|
| WO | 2007047662 | 4/2007 |
| WO | 2007090102 | 8/2007 |

* cited by examiner

FABRICATION OF NANOFIBERS AS DRY ADHESIVES AND APPLICATIONS OF THE SAME

CROSS-REFERENCE TO RELATED APPLICATIONS

This Application is a continuation of application Ser. No. 16/044,934, filed 25 Jul. 2018 (now U.S. Pat. No. 11,180,877), which is a continuation of application Ser. No. 14/720,117, filed 22 May 2015 (now U.S. Pat. No. 10,081,891), which (i) claims the benefit of U.S. Provisional Application No. 62/015,570, filed 23 Jun. 2014, and (ii) is a continuation-in-part of application Ser. No. 14/419,358, filed 3 Feb. 2015 (now U.S. Pat. No. 9,511,528), which was a National Stage Entry of International Patent Application No. PCT/US2013/053807, filed 6 Aug. 2013, and claimed the benefit of U.S. Provisional Application No. 61/679,818, filed 6 Aug. 2012, all of which Applications are incorporated by reference herein in their entireties.

STATEMENT REGARDING FEDERALLY SPONSORED RESEARCH OR DEVELOPMENT

This invention was made with government support under CMMI 0746703, IIP 1246773, IIP 1315174, awarded by the National Science Foundation. The government has certain rights in the invention.

FIELD OF THE INVENTION

The present invention relates to a dry adhesive made from electrospinning spinnable materials. The present invention further relates to a dry adhesive made from aligned, electrospun nanofibers, including where the dry adhesive includes a first plurality of nanofibers mechanically interlocked with a second plurality of nanofibers. The present invention further relates to a dry adhesive made from a first plurality of fiber segments mechanically interlocked with a second plurality of fiber segments. The present invention further relates to one or more methods of making a dry adhesive. The present invention further relates to one or more methods of making aligned fibers, the one or more methods being continuous and scalable.

BACKGROUND OF THE INVENTION

Dry adhesives allow for firm attachment onto a substrate and easy detachment from the substrate. Dry adhesives continue to have certain improved properties as compared to other categories of adhesives, such as hot melt adhesives, solvent based adhesives, polymer dispersion adhesives, chemically curing adhesives, and pressure sensitive adhesives. PCT Publication No. WO 2014/025793 discloses certain advances made in the manufacture of dry adhesives. However, a need remains in the art for further improvements to these removable, reusable, and dry adhesives.

There is a growing demand in the art of removable, reusable and dry adhesives. Typically, dry reusable adhesives produce substantial shear adhesion strengths but significantly lower normal lifting forces, giving rise to high anisotropic adhesion properties. Dry adhesives with anisotropic force distribution may find potential use in several applications such as tapes, fasteners, treads of wall-climbing robots, wall-climbing suits, microelectronics, and medical and space applications.

There is a need in the art for improved methods of forming dry adhesives from electrospinning spinnable materials. There is also a need in the art for dry adhesives with high shear adhesion strength and low normal detachment.

SUMMARY OF THE INVENTION

In a first embodiment, the present invention provides a method for securing two substrates comprising the steps of providing a first substrate having a plurality of substantially aligned fiber segments having void spaces therebetween; providing a second substrate having a plurality of substantially aligned fiber segments having void spaces therebetween; positioning the substantially aligned fiber segments of the first substrate with the void spaces of the second substrate; and positioning the substantially aligned fiber segments of the second substrate with the void spaces of the first substrate; where the positioning steps form a mechanical interlock region utilizing the fiber segments of the first substrate and the fiber segments of the second substrate; where the mechanical interlock region has a shear adhesion strength of at least 40 N/cm$^2$.

In a second embodiment, the present invention provides a method as in the first embodiment, further comprising the step of removing air from the mechanical interlock region.

In a third embodiment, the present invention provides a method as in either the first or second embodiment, wherein the step of providing the first substrate includes directly applying the plurality of substantially aligned fiber segments to the first substrate, and the step of providing the second substrate includes directly applying the plurality of substantially aligned fiber segments to the second substrate.

In a fourth embodiment, the present invention provides a dry adhesive comprising a first plurality of substantially aligned fiber segments having void spaces therebetween, a second plurality of substantially aligned fiber segments having void spaces therebetween, said first plurality of substantially aligned fiber segments being intimately positioned in said void spaces between said second plurality of substantially aligned fiber segments, said second plurality of substantially aligned fiber segments being intimately positioned in said void spaces between said first plurality of substantially aligned fiber segments, such that said first plurality of substantially aligned fiber segments and said second plurality of substantially aligned fiber segments are mechanically interlocked, where the dry adhesive has a shear adhesion strength of at least 40 N/cm$^2$.

In a fifth embodiment, the present invention provides a dry adhesive as in the fourth embodiment, said first plurality of substantially aligned fiber segments and said second plurality of substantially aligned fiber segments being provided by the same plurality of fibers.

In a sixth embodiment, the present invention provides a dry adhesive as in any of the fourth through fifth embodiments, said first plurality of substantially aligned fiber segments being provided by a first plurality of fibers and said second plurality of substantially aligned fiber segments being provided by a second plurality of fibers.

In a seventh embodiment, the present invention provides a dry adhesive as in any of the fourth through sixth embodiments, where the dry adhesive has a shear adhesion strength of at least 45 N/cm$^2$.

In an eighth embodiment, the present invention provides a dry adhesive as in any of the fourth through seventh embodiments, where the dry adhesive has a shear adhesion strength of at least 50 N/cm$^2$.

In a ninth embodiment, the present invention provides a dry adhesive as in any of the fourth through eighth embodiments, the plurality of fibers having a first end region and a second end region, said first plurality of substantially aligned fiber segments being located in said first end region, and said second plurality of substantially aligned fiber segments being located in said second end region.

In a tenth embodiment, the present invention provides a dry adhesive as in any of the fourth through ninth embodiments, wherein the average diameter of the nanofibers is from 50 nanometers to 1000 nanometers.

In an eleventh embodiment, the present invention provides a dry adhesive as in any of the fourth through tenth embodiments, wherein the dry adhesive has a shear adhesion strength that is higher than the normal adhesion strength.

In a twelfth embodiment, the present invention provides a dry adhesive as in any of the fourth through eleventh embodiments, wherein the dry adhesive has a shear adhesion strength that is at least 3000% higher than the normal adhesion strength.

In a thirteenth embodiment, the present invention provides an apparatus for making a dry adhesive comprising a wheel-type frame carrying an external roller, said external roller receiving a face stock therearound when said external roller is in a first position, said external roller receiving an electrospun fiber mat on said face stock when said external roller is in a second position, said external roller dispensing said face stock having said electrospun fiber mat thereon when said external roller is in a third position, said wheel-type frame being capable of moving said external roller from the first position to the second position and from the second position to the third position.

In a fourteenth embodiment, the present invention provides an apparatus as in the thirteenth embodiment, wherein an internal roller is positioned generally centrally with respect to said wheel-type frame, said internal roller comprising a charged electrode and being partially immersed in a spinnable solution, said spinnable solution being held by a container.

In a fifteenth embodiment, the present invention provides an apparatus as in either the thirteenth or fourteenth embodiment, wherein said wheel-type frame carries at least three of said external rollers, each external roller being capable of moving from the first position to the second position and from the second position to the third position.

In a sixteenth embodiment, the present invention provides an apparatus as in any of the thirteenth through fifteenth embodiments, wherein said wheel-type frame carries four of said external rollers, each of said external rollers being spaced equidistant from the other external rollers.

In a seventeenth embodiment, the present invention provides an apparatus as in any of the thirteenth through sixteenth embodiments, wherein said face stock is provided by a roll that conveys face stock to the first position.

In an eighteenth embodiment, the present invention provides an apparatus as in any of the thirteenth through seventeenth embodiments, wherein said external roller moves from the first position to the second position after receiving a predetermined amount of face stock.

In a nineteenth embodiment, the present invention provides an apparatus as in any of the thirteenth through eighteenth embodiments, wherein said external roller moves from the second position to the third position after receiving a predetermined amount of electrospun fiber mat.

In a twentieth embodiment, the present invention provides an apparatus as in any of the thirteenth through nineteenth embodiments, wherein said face stock having said electrospun fiber mat thereon is received by a roll that conveys said face stock having said electrospun fiber mat thereon.

In a twenty-first embodiment, the present invention provides a method for producing a dry adhesive, the method comprising the steps of providing a spinnable material, electrospinning the spinnable material to form a non-woven, wherein the non-woven comprises nanofibers, where said nanofibers are substantially aligned in a parallel alignment.

In a twenty-second embodiment, the present invention provides a method as in the twenty-first embodiment, wherein the spinnable material is a solution of a polymeric material and a solvent.

In a twenty-third embodiment, the present invention provides a method as in either the twenty-first or twenty-second embodiment, wherein the polymeric material is selected from the group consisting of polyurethanes, polycaprolactones, polyvinyl alcohols, poly(vinyldiene fluoride)s, polyamides, polybenzimidazoles, polycarbonates, polyacrylonitriles, polylactic acids, polyethylene oxides, polyethylene terepthalates, polystyrenes, polyvinyphenols, polyvinylchlorides, cellulose acetates, polyether imides, polyethylene glycols, poly(ferrocenyldimethylsilane)s and mixtures thereof.

In a twenty-fourth embodiment, the present invention provides a method as in any of the twenty-first through twenty-third embodiments, wherein the solvent is selected from the group consisting of toluene, tetrahydrofuran, dichloromethane, chloroform, methanol, dimethylacetamide, dimethyl sulfoxide, dimethylformamide, xylene, acetone, ethanol, formic acid, distilled water, trifluoracetic acid, hexafluoro-2-propanol and mixtures thereof.

In a twenty-fifth embodiment, the present invention provides a method as in any of the twenty-first through twenty-fourth embodiments, wherein the solution further includes an adhesive component, the adhesive component being a viscoelastic or a resin-curable component.

In a twenty-sixth embodiment, the present invention provides a method as in any of the twenty-first through twenty-fifth embodiments, wherein the adhesive component has a Young's modulus of 0.1 GPA or less.

In a twenty-seventh embodiment, the present invention provides a method as in any of the twenty-first through twenty-sixth embodiments, wherein the adhesive component is flowable at room temperature.

In a twenty-eighth embodiment, the present invention provides a method as in any of the twenty-first through twenty-seventh embodiments, wherein the adhesive component is selected from the group consisting of polyisobutylenes, pressure sensitive adhesive materials and tackifiers.

In a twenty-ninth embodiment, the present invention provides a method as in any of the twenty-first through twenty-eighth embodiments, wherein the adhesive component is selected from the group consisting of polyisobutylene, acrylics, butyl rubber, ethylene-vinyl acetate (EVA) with high vinyl acetate content, natural rubber, nitriles, silicone rubbers, styrene block copolymers (SBC), styrene-butadiene-styrene (SBS), styrene-ethylene/butylene-styrene (SEBS), styrene-ethylene/propylene (SEP), styrene-isoprene-styrene (SIS), vinyl ethers, and mixtures thereof.

In a thirtieth embodiment, the present invention provides a method as in any of the twenty-first through twenty-ninth embodiments, wherein the adhesive component is selected from the group consisting of rosins, rosin derivates, terpenes, modified terpenes, aliphatic, cycloaliphatic and aromatic resins (C5 aliphatic resins, C9 aromatic resins, and C5/C9 aliphatic/aromatic resins), hydrogenated hydrocarbon resins, terpene-phenol resins (TPR), and mixtures thereof.

In a thirty-first embodiment, the present invention provides a method as in any of the twenty-first through thirtieth embodiments, wherein the dry adhesive has a shear adhesion strength that is higher than the normal adhesion strength.

In a thirty-second embodiment, the present invention provides a method as in any of the twenty-first through thirty-first embodiments, wherein the method further comprises the step of subjecting the non-woven to plastic deformation.

In a thirty-third embodiment, the present invention provides a method as in any of the twenty-first through thirty-second embodiments, wherein said step of subjecting the non-woven to plastic deformation includes passing the non-woven through an equal channel angular extrusion vial.

In a thirty-fourth embodiment, the present invention provides a dry adhesive, the dry adhesive comprising a non-woven fabric of electrospun polymeric nanofibers substantially aligned in a parallel alignment.

In a thirty-fifth embodiment, the present invention provides a method as in the thirty-fourth embodiment, wherein the average diameter of the nanofibers is from 50 nanometers to 500 nanometers.

In a thirty-sixth embodiment, the present invention provides a method as in either the thirty-fourth or thirty-fifth embodiment, wherein the average diameter of the nanofibers is from 270 nanometers to 400 nanometers, the thickness of the dry adhesive is about 10 μm, and the work of adhesion is from 180 mJ/m² to 350 mJ/m².

In a thirty-seventh embodiment, the present invention provides a method as in any of the thirty-fourth through thirty-sixth embodiments, wherein the average diameter of the nanofibers is from 50 nanometers to 300 nanometers, the thickness of the dry adhesive is from 15 μm to 100 μm, and the shear adhesion strength is about 27 N/cm².

In a thirty-eighth embodiment, the present invention provides a method as in any of the thirty-fourth through thirty-seventh embodiments, wherein the dry adhesive has a shear adhesion strength that is higher than the normal adhesion strength.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATING EMBODIMENTS

Figure 1:
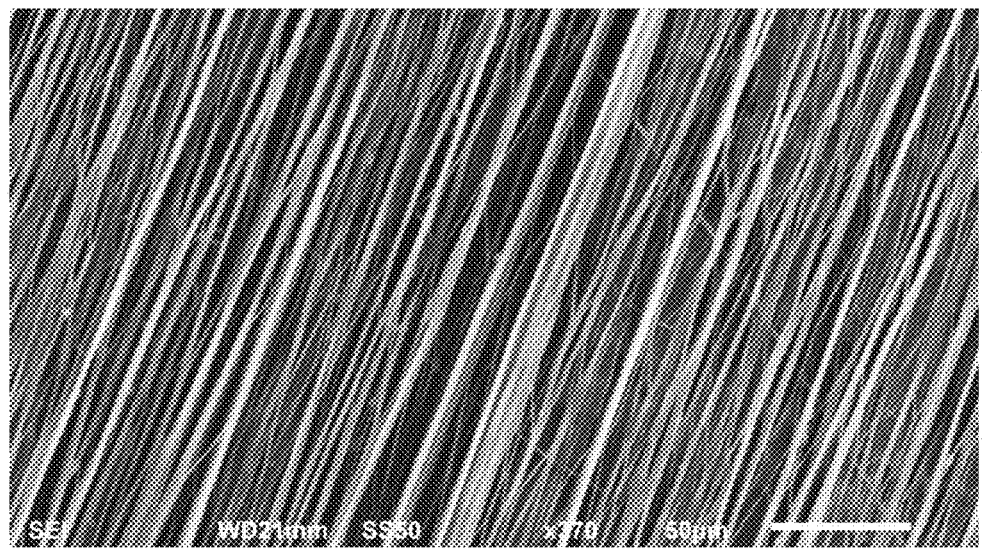
FIG. 1 is a scanning electron microscopy (SEM) image of electrospun, aligned fibers.

Embodiments of the invention are based, at least in part, on the discovery of a dry adhesive formed by mechanically interlocking a first plurality of substantially aligned fiber segments with a second plurality of substantially aligned fiber segments. In one or more embodiments, a first plurality of substantially aligned fibers comprises the first plurality of substantially aligned fiber segments and a second plurality of substantially aligned fibers comprises the second plurality of substantially aligned fiber segments. In one or more embodiments, a single plurality of substantially aligned fibers is provided, where the plurality has a first end region and a second end region, where the first end region and the second end region are mechanically interlocked. In one or more embodiments, a first plurality of aligned fibers is mechanically interlocked with a second plurality of aligned fibers. In certain advantageous embodiments, a dry adhesive is formed using a semi-batch or a continuous process. In one or more embodiments, the fibers are formed by an electrospinning process. A dry adhesive having substantially aligned polymeric nanofibers and one or more methods of making will now be described in greater detail. It should be noted that the specific materials and the specific process conditions disclosed in the following disclosures are given only as examples within the scope of the invention, and this invention should not be limited to these materials or process conditions as such.

The present disclosure further relates to a method of forming a dry adhesive by engineering an electrospun non-woven of a highly spinnable polymer, wherein the polymer fiber forming the non-woven is aligned. The present invention further relates to a method of forming a dry adhesive from aligned, electrospun nanofibers. In one or more embodiments, a dry adhesive is provided that comprises aligned polymeric nanofibers. In some such embodiments, a spinnable solution is combined with an adhesive component to further enhance the adhesion onto substrates. In some embodiments, the non-woven is electrospun from a polymer solution including a small amount of low modulus adhesive component.

In one or more embodiments, microprotrusions are formed by electrospinning polymeric nanofiber structures and thereafter subjecting the structures to conforming to surface asperities. In some such embodiments, the spinnable solution is combined with an adhesive component to further augment the adhesion onto substrates.

Electrospinning is employed to create non-woven fabrics of nanofibers that can serve as dry adhesives. The electrospinning process is generally well known. A voltage is applied to a spinnable liquid held in a spinning tip or spinneret (typically similar to a syringe or needle) directed toward a grounded collector. Electrostatic repulsion counteracts the surface tension of the liquid at the tip and a Taylor cone forms from which a stream of liquid (or jet) erupts toward the collector. The jet elongates and collects on the collector as nanofibers, i.e., fibers with nanometer scale diameters. The collection is typically termed a non-woven fabric, as the nanofibers overlap and collect in a sheet-like form.

Electrospun fibers with good alignment exhibit significant improvement in adhesion strength compared to bulk materials.

In some embodiments, specific electrospinning apparatus are used to encourage the formation of non-woven fabrics having aligned nanofibers. The nanofibers can be aligned using a rotating collector or a parallel electrodes collector. The rotating collector is typically cylindrically shaped, although any shapes known in the art can be utilized. The rotating collector can be a drum or a disc.

Figure 2:
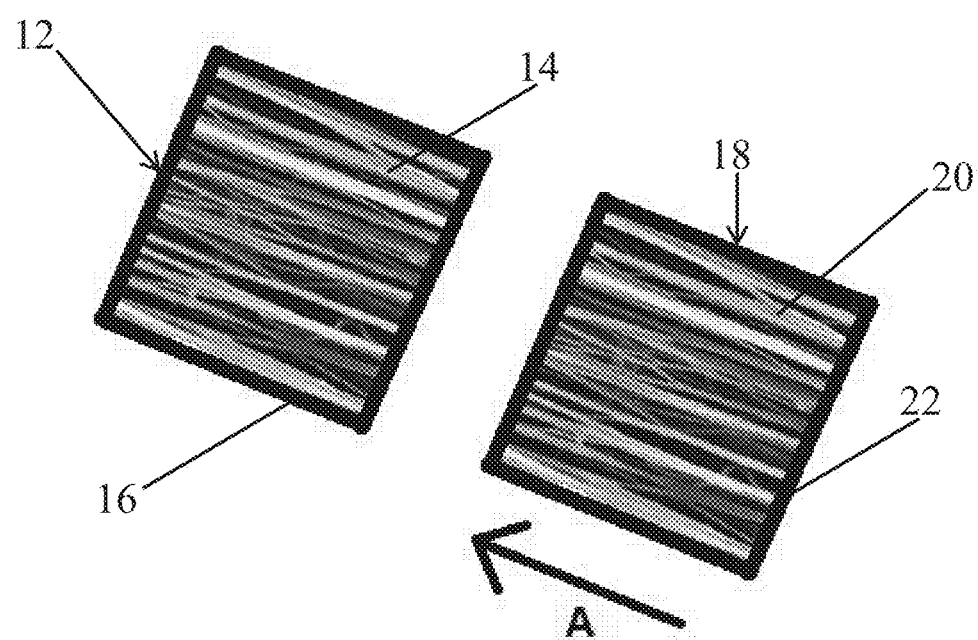
FIG. 2 is a schematic showing a first plurality of aligned fibers and a second plurality of aligned fibers before the first plurality of aligned fibers and second plurality of aligned fibers are mechanically interlocked.

Referring now to FIG. 2, a first fiber mat, generally indicated by the numeral 12, includes a plurality of substantially aligned fibers 14 on a face stock 16. A second fiber mat, generally indicated by the numeral 18, includes a plurality of substantially aligned fibers 20 on a face stock 22. Although first fiber mat 12 and second fiber mat 18 are shown with face stock 16 and face stock 22, it should be appreciated that first fiber mat 12 and second fiber mat 18 can also be made only from substantially aligned fibers 14 and substantially aligned fibers 20, respectively. Face stock 16 and face stock 22 may be provided to give additional support to substantially aligned fibers 14 and substantially aligned fibers 20, respectively. To form mechanical interlocking between substantially aligned fibers 14 and substantially aligned fibers 20, first fiber mat 12 is brought into intimate contact with second fiber mat 18, as represented by arrow A.

Figure 3:
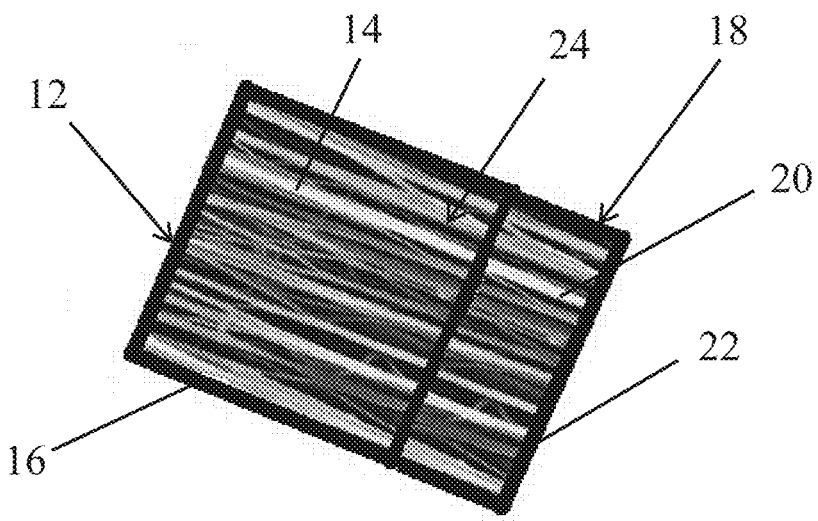
FIG. 3 is a schematic showing a first plurality of aligned fibers and a second plurality of aligned fibers where the first plurality of aligned fibers and second plurality of aligned fibers are mechanically interlocked.
Figure 9:
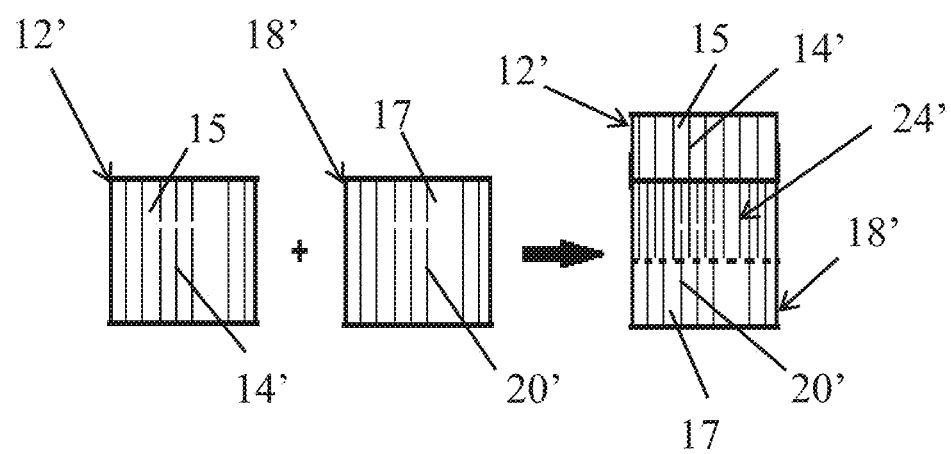
FIG. 9 is a schematic showing a first plurality of aligned fibers becoming mechanically interlocked with a second plurality of aligned fibers.

Referring now to FIG. 3, substantially aligned fibers 14 of first fiber mat 12 are mechanically interlocked with substantially aligned fibers 20 of second fiber mat 18. The mechanical interlock occurs at a mechanical interlock region, generally indicated by the numeral 24. It should be appreciated that FIG. 3 is not fully representative of mechanical interlocking as defined herein, because it does not show the fibers interlocked with a void space. It should be appreciated that FIG. 4 and FIG. 9 show schematic representations of mechanical interlock as defined herein.

FIG. 2 and FIG. 3 are representative of one or more embodiments where a first plurality of fibers and a second plurality of fibers are brought together by mechanical interlocking. FIG. 4 is representative of one or more embodiments where a plurality of fibers has a first end region and a second end region, where the first end region and second end region are mechanically interlocked. For FIGS. 2-4, it can be said that a first plurality of fiber segments and a second plurality of fiber segments are mechanically interlocked.

Figure 4:
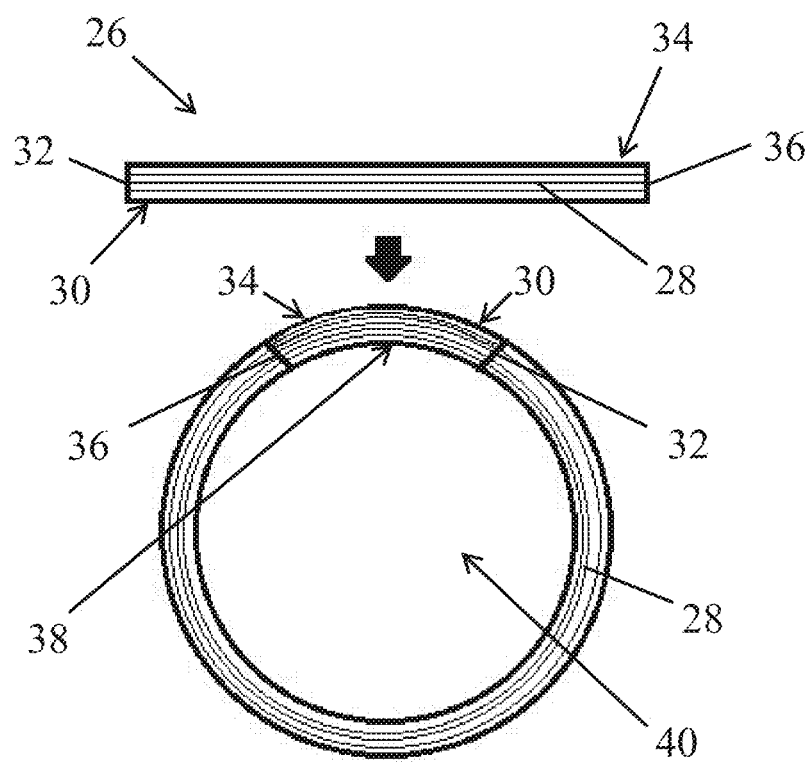
FIG. 4 is a schematic showing a plurality of aligned fibers, the plurality having a first end region and a second end region, where the first end region and second end region are mechanically interlocked.

Referring now to FIG. 4, a fiber mat, generally indicated by the numeral 26, includes a plurality of substantially aligned fibers 28. In one or more embodiments, fiber mat 26 includes a face stock. In one or more embodiments, fiber mat 26 is devoid of a face stock. In one or more embodiments, fiber mat 26 consists only of substantially aligned fibers 28.

Fiber mat 26 includes a first end region, generally indicated by the numeral 30, terminating at end 32, and a second end region, generally indicated by the numeral 34, terminating at end 36. Fiber mat 26 can then be manipulated, such as by wrapping around, to bring first end region 30 into intimate contact with second end region 34. This intimate contact allows the fibers of first end region 30 to enter the void spaces of second end region 34, and the fibers of second end region 34 to enter the void spaces of first end region 30, as to form a mechanical interlock region, generally indicated by the numeral 38. Opening, generally indicated by the numeral 40, formed by fiber mat 26 can contain one or more objects.

Referring now to FIG. 9, a first fiber mat, generally indicated by the numeral 12', includes a plurality of substantially aligned fibers 14' having void spaces 15 therebetween. A second fiber mat, generally indicated by the numeral 18', includes a plurality of substantially aligned fibers 20' having void spaces 17 therebetween. To form mechanical interlocking between substantially aligned fibers 14' and substantially aligned fibers 20', first fiber mat 12' is brought into intimate contact with second fiber mat 18', as represented by the arrow provided. Substantially aligned fibers 14' of first fiber mat 12' are mechanically interlocked with substantially aligned fibers 20' of second fiber mat 18' based on substantially aligned fibers 14' entering void spaces 17 between substantially aligned fibers 20'. Similarly, substantially aligned fibers 20' enter void spaces 15 between substantially aligned fibers 14'. The mechanical interlock occurs at a mechanical interlock region, generally indicated by the numeral 24'.

As used herein, dry adhesive or adhesion can be generally defined as attaching one substance to another substance. As used herein, adhesive or dry adhesive can be generally defined as attaching one substrate to another substrate, or as attaching one plurality of fiber segments or fibers with another plurality of fibers or fiber segments. As suggested herein, adhesion can be achieved by mechanical interlock, which can also be described as mechanical adhesion.

The fibers described herein, which can also be referred to as aligned nanofibers, can be formed by electrospinning a spinnable liquid. Once received by an electrospinning collection surface, the fibers can also be described as an electrospun non-woven or a fiber mat. As will be further described below, viscoelastic properties of the fibers can be adjusted based on the use of various polymers, solvents, and additives. The viscoelasticity of the nanofibers can be finely tuned to enhance the intimate contacts between nanofibers and their derived mechanical interlocks.

It should be appreciated that the use of the term alignment or substantially aligned is meant to describe the fibers as extending in a common direction. It should be appreciated that the alignment is general in nature and not absolutely perfect alignment as the collection of nanofibers on the collecting surface exhibits a minute degree of instability. Thus, the alignment of nanofibers can also be referred to as being substantially aligned or generally aligned. Exemplary alignment is shown in the scanning electron microscopy (SEM) image in FIG. 1. Electrospun fibers having general alignment exhibit significant improvement in adhesion strength compared to randomly orientated fiber mats, particularly those mats having a high degree of porosity. The porosity of a fiber mat provided herein is substantially reduced at least due to the alignment of the fibers.

In one or more embodiments of the present invention, specific electrospinning apparatus are used to encourage the formation of non-woven fabrics having aligned nanofibers. The nanofibers can be aligned using a rotating mandrel or a parallel electrodes collector. The rotating collector is typically cylindrically shaped, although any shapes known in the art can be utilized. The rotating mandrel can be a drum or a disc. The collected fibers tend to be drawn, stretched, and aligned in the direction of rotation. In one or more embodiments, a more helical winding of the nanofibers is achieved to create a non-woven with aligned fibers in a helical arrangement. It can be said that the nanofibers are aligned to be substantially parallel with other nanofibers. The collected fibers are understood as being aligned as opposed to randomly collected.

The alignment of the fibers can be induced by a rotating drum where the degree of fiber alignment improves with the rotational speed. Randomly oriented fibers are obtained on the drum at take-up velocity (TUV) lower than the fiber TUV. At higher TUV, the fibers extend before being collected on the drum due to a centrifugal force which is developed on the surface of the rotating drum.

Electrospinning is preferably employed to create non-woven fabrics of nanofibers that can serve as dry adhesives. Electrospinning processes are generally well known by those skilled in the art. It is preferred that syringe-less or nozzle-less electrospinning processes are used to form dry adhesives of the present invention. One or more aspects of an electrospinning process may be disclosed by U.S. Pat. Nos. 7,585,437; 8,157,554; 8,231,822; and 8,573,959, which are incorporated herein by reference.

A syringe-less or nozzle-less electrospinning process can generally include a container for a polymer solution having at least one polymer solution inlet and at least one polymer solution outlet. The at least one polymer solution inlet and outlet serve to provide circulation of the polymer solution and to maintain the constant height of its level in the container. An air supply can be provided to supply air to the space between a charged electrode and a counter electrode.

The charged electrode is partially immersed in the polymer solution. By rotating the charged electrode, the part of its circumference that is immersed in the polymer solution draws the polymer solution from the container into the space between the charged electrode and the counter electrode, where an electric field is formed. The nanofibers then form on the surface of the counter electrode support material. The formed nanofibers are attracted to the counter electrode based on the effects of the electric field, and consequently they are deposited on the surface of the counter electrode support material, such as a roller. The surface of the counter electrode support material can include a collection material thereon, such as a face stock, for receiving the nanofibers. The thickness of the layer of nanofibers can be controlled by maintaining the counter electrode support material in a collecting position for a predetermined time period. The thickness of the layer of nanofibers can also be controlled using the velocity of an associated reeling device and unreeling device.

Figure 5:
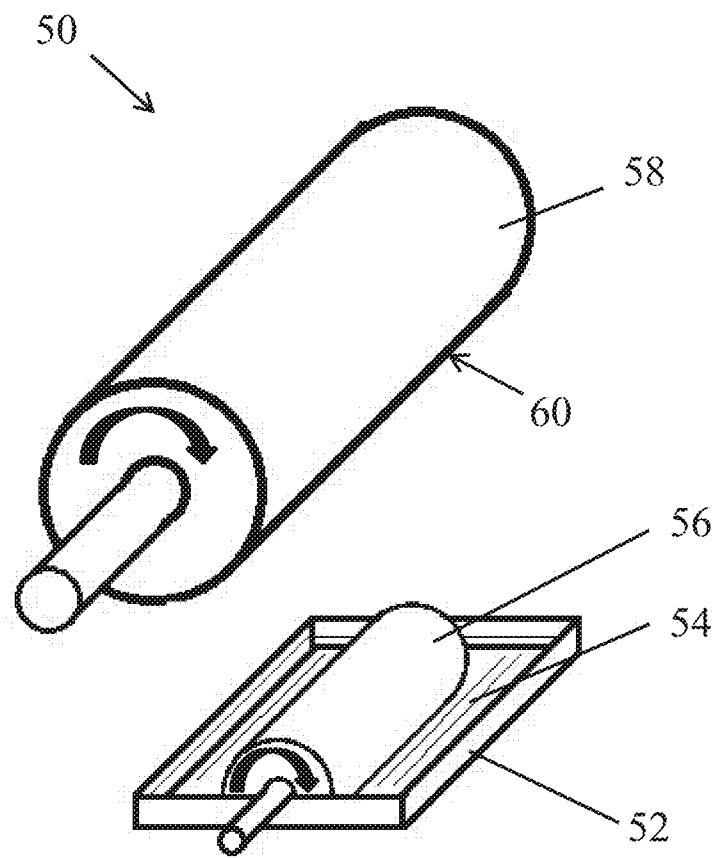
FIG. 5 is a schematic showing an apparatus for forming a plurality of aligned fibers in a generally batch process.

Referring now to FIG. 5, an electrospinning apparatus for creating non-woven fabrics with aligned nanofibers is shown and designated by the numeral 50. Apparatus 50 includes a container 52 holding a spinnable solution 54 for electrospinning. A roller 56 comprises a charged electrode and is partially immersed in spinnable solution 54. Roller 56 can include a multitude of protrusions (not shown), which can become coated with spinnable solution 54.

A second roller 58 comprises a counter electrode and is positioned proximate to roller 56. Second roller 58 provides a peripheral collecting surface 60 that can have a face stock positioned therearound. Second roller 58 can be provided as a drum collector, where the designation as a drum collector typically relates to the collector having a collecting surface that is of a more substantial axial length, whereas designation as a disc collector typically relates to the collector having a very narrow collecting surface, i.e., a more sharp edge.

Roller 56 comprising the charged electrode is allowed to rotate, as indicated by the provided arrow, such that the portion of its circumference that is immersed in spinnable solution 54 is able to draw spinnable solution 54 from container 52. Upon rotation of roller 56, spinnable solution 54 is drawn into a space between the charged electrode and the counter electrode, that is, between roller 56 and second roller 58, where an electric field is formed. The formed nanofibers are attracted to the counter electrode based on the effects of the electric field, and consequently they are deposited on surface 60 of second roller 58.

Second roller 58 is also rotatable, as indicated by the provided arrow, as to allow multiple layers of nanofibers to be collected thereon. Surface 60 of second roller 58 can include a collection material thereon, such as a face stock, for receiving the nanofibers. The thickness of the layer of nanofibers can be controlled by allowing the electrospinning to occur for a predetermined time period or for a predetermined amount of rotations of second roller 58.

Roller 56 and second roller 58 can rotate either in the same direction or in opposite directions. Fiber alignment can be improved if roller 56 and second roller 58 rotate in the same direction.

Roller 56 and second roller 58 can be rotated by any known methods in the art, such as by attachment to a motor.

Based on the above, it should be appreciated that the apparatus in FIG. 5 operates as a generally batch process.

Figure 6:
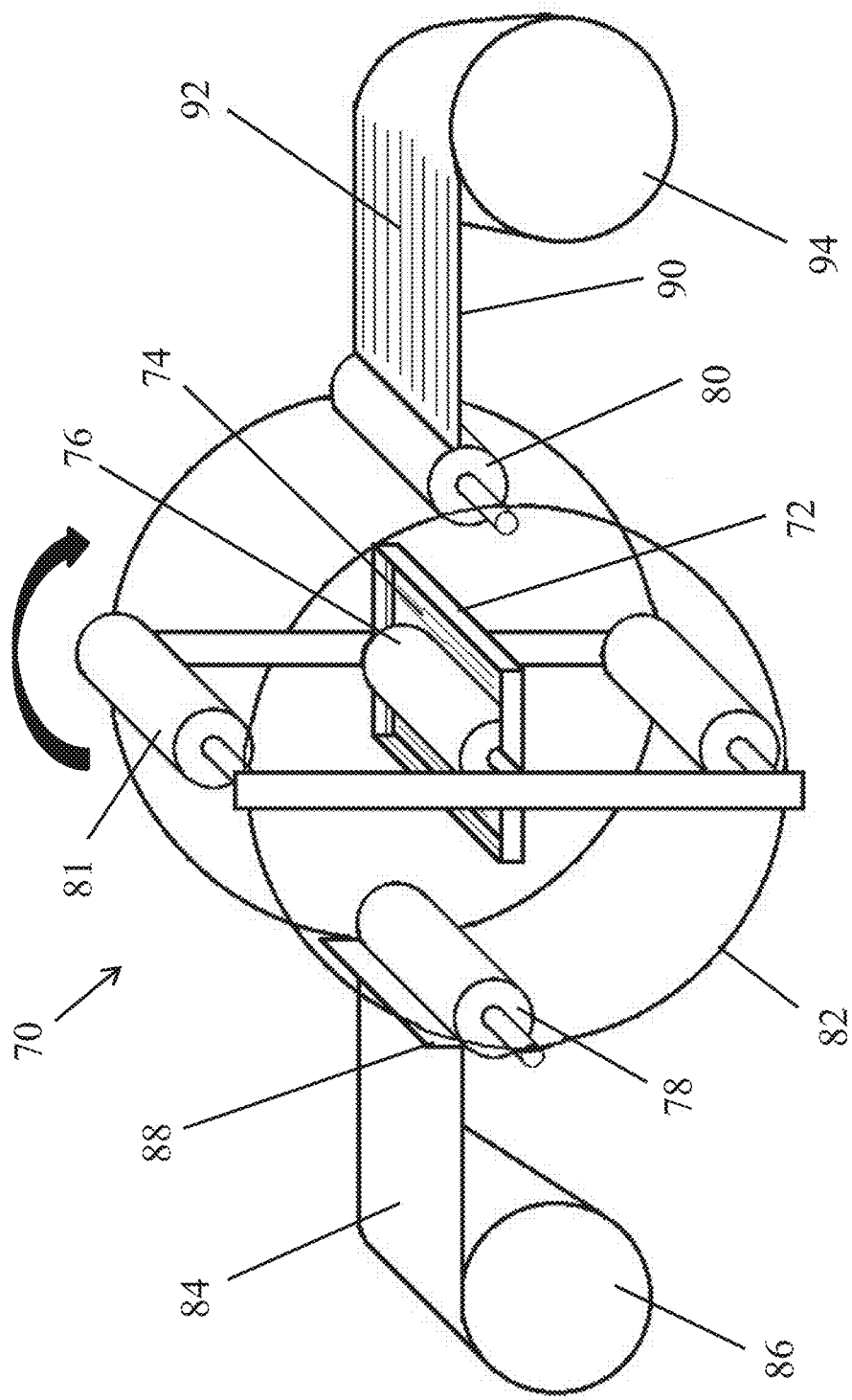
FIG. 6 is a schematic showing an apparatus for forming a plurality of aligned fibers in a generally semi-batch or continuous process.

Referring now to FIG. 6, an electrospinning apparatus for creating non-woven fabrics with aligned nanofibers is shown and designated by the numeral 70. Apparatus 70 includes a container 72 holding a spinnable solution 74 for electrospinning. An internal roller 76 comprises a charged electrode and is partially immersed in a spinnable solution 74. Internal roller 76 can include a multitude of protrusions (not shown), which can become coated with spinnable solution 74.

Apparatus 70 includes a plurality of external rollers 78, 80, 81, each comprising a counter electrode. External rollers 78, 80, 81 are coupled as by way of wheel 82. Wheel 82 is rotatable, as indicated by the provided arrow, as to move external rollers 78, 80, 81 to various positions. Wheel 82 may also be described as wheel-type frame 82. External rollers 78, 80, 81 may be positioned equidistant with each other. That is, external roller 78 may be positioned equidistant from external roller 80 and external roller 81. Where four external rollers are utilized, the four external rollers may be positioned equidistant from each other.

An external roller in the position of external roller 78 receives a face stock 84 from a roll 86. Roll 86 can rotate to dispense face stock 84 and external roller 78 can rotate to receive face stock 84. It can be said that roll 86 conveys face stock 84 to external roller 78. Once roller 78 has received sufficient face stock 84, cutting device 88 can cut the face stock 84. Cutting device 88 can be any known device for cutting or severing a face stock.

After roller 78 receives a predetermined amount of face stock 84, it is allowed to rotate to the position of external roller 81. Once in that position, internal roller 76 is allowed to rotate, such that the portion of its circumference that is immersed in polymer solution 74 is able to draw polymer solution 74 from container 72. Upon rotation of roller 76, polymer solution 74 is drawn into a space between the charged electrode and the counter electrode, that is, between roller 76 and external roller 81, where an electric field is formed. The formed nanofibers are attracted to the counter electrode based on the effects of the electric field, and consequently they are deposited on the surface of the roller positioned as at external roller 81. External roller 81 is also rotatable as to allow multiple layers of nanofibers to be collected thereon. The surface of external roller 81 includes face stock 84 as a collection material for receiving the nanofibers. The thickness of the layer of nanofibers can be controlled by allowing the electrospinning to occur for a predetermined time period or for a predetermined amount of rotations of external roller 81.

External rollers 78, 80, and 81 can rotate either in the direction of the rotation of internal roller 76 or in the opposite direction of the rotation of internal roller 76. As suggested above, fiber alignment can be improved if external rollers 78, 80, and 81 rotate in the same direction as internal roller 76.

Once electrospinning has been allowed to occur for a predetermined time period, external roller 81 is allowed to rotate to the position of external roller 80. At this point of the process, external roller 81 comprises a fiber mat 90 having substantially aligned fibers 92. Once at the position of external roller 80, external roller 80 is allowed to rotate as to collect fiber mat 90. External roller 80 can rotate to dispense fiber mat 90 and roll 94 can rotate to receive fiber mat 90. It can be said that roll 94 conveys fiber mat 90 having substantially aligned fibers 92 to roll 94. Once roller 80 has dispensed all of fiber mat 90, wheel 82 and external rollers are allowed to move to the next position.

External rollers 78, 80, 81 can be provided as drum collectors, where the designation as drum collectors typically relates to the collectors having a collecting surface that is of a more substantial axial length, whereas designation as disc collectors typically relates to the collector having a very narrow collecting surface, i.e., a more sharp edge.

Based on the above, it should be appreciated that the apparatus in FIG. 6 can be said to operate as a generally semi-batch process on the basis that the external rollers move to, and remain at, discrete positions. It should also be appreciated that the apparatus in FIG. 6 can be said to operate as a generally continuous and roll-to-roll process on the basis that it can continuously make fiber mat product. Such an apparatus and process may be scaled, such as including more external rollers, or differing configurations, as to make the process even more continuous and roll-to-roll.

Figure 8:
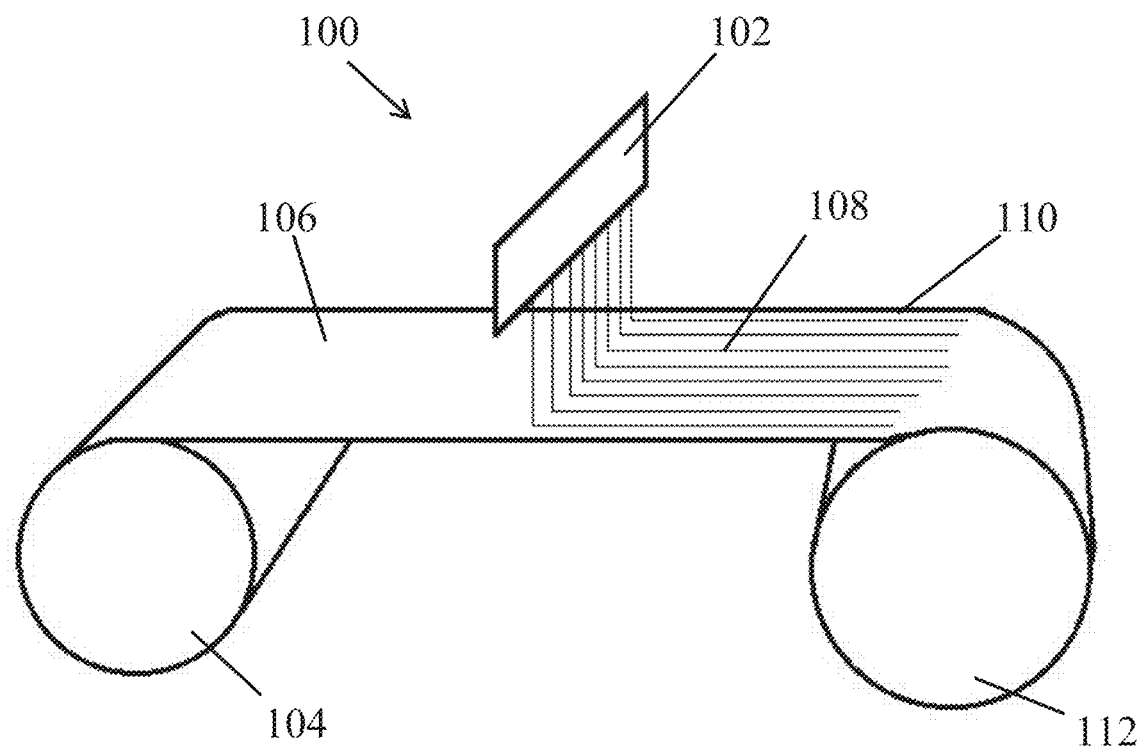
FIG. 8 is a schematic showing an apparatus for forming a plurality of aligned fibers in a generally continuous process.

Referring now to FIG. 8, an electrospinning apparatus for creating non-woven fabrics with aligned nanofibers is shown and designated by the numeral 100. The apparatus 100 includes a dispenser 102 holding a spinnable solution for electrospinning.

A roll 104 comprises a face stock 106 that moves underneath dispenser 102. Roll 104 can rotate to dispense face stock 106. Apparatus 100 includes a charged electrode and a ground electrode such that dispenser 102 can electrospun nanofibers onto face stock 106 as it moves underneath dispenser 102. In one or more embodiments, dispenser 102 comprises a charged electrode and a ground electrode is positioned below or on face stock 106. In one or more embodiments, a charged electrode and a ground electrode are positioned below or on a conveyer belt. The electrospun nanofibers form as aligned fibers 108 to form fiber mat 110. Fiber mat 110 can be collected by a roll 112, as by roll 112 rotating to collect fiber mat 110. Further details of such roll-to-roll processes are known to those skilled in the art.

Based on the above, it should be appreciated that the apparatus in FIG. 8 operates as a generally continuous process.

As described herein, nanofibers are formed by electrospinning a spinnable liquid. The spinnable liquid can also be described as a spinnable polymer solution or a spinnable solution. In one or more embodiments, the spinnable liquid is polymeric. Most polymers can be dissolved in suitably selected solvents. In one or more embodiments, the spinnable liquid is a polymer solution comprising a highly spinnable polymer carried in an appropriate solvent at an overall viscosity suitable for electrospinning.

In one or more embodiments, the spinnable polymer can be selected from polyurethanes (PU), polycaprolactones (PCL), polyvinyl alcohols (PVA), poly(vinyldiene fluoride)s (PVDF), polyamides (PA), polybenzimidazoles (PBI), polycarbonates (PC), polyacrylonitriles (PAN), polylactic acids (PLA), polyethylene oxides (PEO) and polyethylene glycols (PEG), polyethylene terephthalates (PET), polystyrenes (PS), polyvinylphenols (PVP), polyvinylchlorides (PVC), cellulose acetates (CA), polyether imides (PEI), poly(ferrocenyldimethylsilane)s (PFDMS), polyvinylpyrrolidone, polytetrafluoroethylene, polynorbornene, polysulfone, polyether ether ketone, polyacrylates including poly(methyl methacrylate) (PMMA), 2-hydroxyethyl methacrylate (PHEMA), poly(glycidyl methacrylate), poly(2-dimethylamino ethylmethacrylate) (PDMAEMA), poly(2-methacryloyloxyethyl phosphorylcholine), polyacrylamides including poly(N-isopropylacrylamide) (PNIPAM) and poly(N,N-dimethyl acrylamide) (PDMA), and mixtures thereof.

Thus, in one or more embodiments, the spinnable liquid is a polymer solution formed from one or more polymers dissolved in one or more solvents. The particular one or more polymers and one or more solvents can be chosen based on the corresponding properties. In one or more embodiments, two or more solvents are used in the spinnable liquid to produce synergistic effects.

Suitable solvents will be appreciated as being useful for particular polymers. In accordance with the list of polymers provided herein, suitable solvents can be chosen from toluene, tetrahydrofuran (THF), dichloromethane (DCM), chloroform ($CHCl_3$), alcohols including methanol, ethanol, and propanol, dimethylacetamide (DMAC), dimethyl sulfoxide (DMSO), dimethylformamide (DMF), 2-butanone, 1-butyl-3-methylimidazolium chloride, xylene, acetone, formic acid, distilled water, trifluoroacetic acid, hexafluoro-2-propanol, ionic liquids, and mixtures thereof.

In one or more embodiments, the polymer or polymers are present in the polymer solution at a concentration suitable for providing acceptable solution properties, such as viscosity, conductivity, and surface tension, suitable for successful electrospinning. The molecular weight and molecular weight distribution and architecture of the polymer can also be varied to achieve a desired electrospinning.

In one or more embodiments, the polymer or polymers are present in the polymer solution at a percentage of from 1 wt % or more to 30 wt % or less. In one or more embodiments, the polymer or polymers are present in the polymer solution at a concentration of from 3 wt % or more to 25 wt % or less, in other embodiments, from 5 wt % or more to 20 wt % or less.

The viscosity of the solution influences its spinnability. Controlling the viscosity of a solution is generally known in the art. A solution that is too viscous, and a solution that is not viscous enough, cannot be spun.

In some embodiments, the highly spinnable solution can be selected from one or more of the following: (i) nylon 6,6 dissolved in formic acid with a concentration of 5-20 wt %; (ii) polyurethanes dissolved in dimethyl formamide with a concentration of 5-20 wt %; (iii) polybenzimidazole (PBI) dissolved in dimethyl acetamide with a concentration of 5-10 wt %; (iv) polycarbonate dissolved in dimethyl formamide:tetrahydrofuran with a concentration of 5-10 wt %; (v) polycarbonate dissolved in dichloromethane with a concentration of 5-20 wt %; (vi) polyacrylonitrile (PAN) dissolved in dimethyl formamide with a concentration of 5-20 wt %; (vii) polyvinyl alcohol (PVA) dissolved in distilled water with a concentration of 1-16 wt %; (viii) polylactic acid (PLA) dissolved in dichloromethane with a concentration of 1-15 wt %; (ix) polyethylene oxide (PEO) dissolved in distilled water with a concentration of 4-10 wt %; (x) polyethylene terephthalate (PET) dissolved in dichloromethane and trifluoracetic acid with a 12-18 wt %; (xi) polystyrene (PS) dissolved in tetrahydrofuran with a concentration of 1-25 wt %; (xii) polyvinyl phenol (PVP) dissolved in tetrahydrofuran with a concentration of 20-60% (wt./vol.); (xiii) polyvinylchloride (PVC) dissolved in mixture of tetrahydrofuran and dimethylformamide with 10-15 wt %; (xiv) cellulose acetate, CA dissolved in acetone and acetic acid, dimethylacetamide; with a concentration of 12.5-20%; (xv) poly(vinylidene fluoride) (PVDF) dissolved in mixture of dimethylformamide and dimethylacetamide with a concentration of 20 wt %; (xvi) polyether imide (PEI) dissolved in hexafluoro-2-propanol with a concentration of 10 wt %; (xvii) polyethylene glycol (PEG) dissolved in chloroform with a concentration of 0.5-30 wt % poly(ferrocenyldimethylsilane); and (xviii) PFDMS dissolved in tetrahydrofuran and dimethylformamide with a concentration of 5-30 wt %.

The dielectric properties of a solvent can be controlled as desired for better dry adhesive properties.

In one or more embodiments, the spinnable liquid is combined with an adhesive component to further enhance the adhesion properties. In one or more embodiments, the non-woven is electrospun from a polymer solution including a small amount of low modulus adhesive component. The adhesive component can be chosen to provide selected adhesion capability in certain embodiments. The adhesive component can impact the intermolecular interactions such as van der Waals forces, such that these interactions are further augmented by the adhesive nature of the low modulus viscous component and its dielectric properties. The adhesive component is broadly a viscoelastic and/or a resin-curable component. In some embodiments, the low modulus viscous component is flowable at room temperature.

In one or more embodiments, the adhesive component has a Young's modulus of less than 0.1 GPA (gigapascal). In other embodiments, the adhesive component has a Young's modulus of 0.1 GPA or less, in other embodiments 0.075 GPA or less, in other embodiments 0.05 GPA or less, in other embodiments 0.03 GPA or less, in other embodiments 0.02 GPA or less, in other embodiments 0.01 GPA or less, in other embodiments 0.005 GPA or less, in other embodiments 0.001 GPA or less.

In embodiments comprising an adhesive polymeric component, the adhesive polymeric component can be added in order to improve the shear adhesion of the resulting non-woven. The adhesive properties of electrospun fibers can be finely tuned by solution blending techniques that are well known in the art.

In one or more embodiments, the adhesive component is polyisobutylene. Polyisobutylene, which can also be referred to as "PIB" or $(C_4H_8)_n$, is the homopolymer of isobutylene, or 2-methyl-1-propene, on which butyl rubber is based. Structurally, polyisobutylene resembles polypropylene, having two methyl groups substituted on every other carbon atom.

In one or more embodiments, the adhesive component is a material typically suitable as a pressure sensitive adhesive. A pressure sensitive adhesive (PSA, self adhesive, self stick adhesive) is an adhesive that forms a bond when pressure is applied to marry the adhesive with the adherend. No solvent, water, or heat is needed to activate the adhesive. PSA's are usually based on an elastomer compounded with a suitable tackifier (e.g., a rosin ester). In one or more embodiments, the pressure sensitive adhesive elastomer is chosen from acrylics, butyl rubber, ethylene-vinyl acetate (EVA) with high vinyl acetate content, natural rubber, nitriles, silicone rubbers, styrene block copolymers (SBC), styrene-butadiene-styrene (SBS), styrene-ethylene/butylene-styrene (SEBS), styrene-ethylene/propylene (SEP), styrene-isoprene-styrene (SIS), vinyl ethers, and mixtures thereof.

In one or more embodiments, an electrospinnable liquid solution includes a tackifier. Tackifiers are chemical compounds that can be used in formulating adhesives to increase the tack, the wettability between an adhesive and a substrate, and the stickiness of the surface of an adhesive. They are generally low-molecular weight compounds with glass transition temperature above room temperature. At low strain rate, they provide higher stress compliance, and become stiffer at higher strain rates. Tackifiers are generally resins (e.g. rosins and their derivatives, terpenes and modified terpenes, aliphatic, cycloaliphatic and aromatic resins (C5 aliphatic resins, C9 aromatic resins, and C5/C9 aliphatic/aromatic resins), hydrogenated hydrocarbon resins, and their mixtures, terpene-phenol resins (TPR, used often with ethylene-vinyl acetate adhesives)). A tackifier can be dissolved in a solvent including DCM, toluene, THF, and DMAC prior to electrospinning and therefore integrated with the spinnable material.

In one or more embodiments, the adhesive component is cyanoacrylate or polyacrylate.

In one or more embodiments, the adhesive component is present in an amount from 1 wt % or more to 5 wt % or less, based upon the total weight of the spinnable material. The content should be low enough as to not interfere with the spinnability of the major component as a solution for electrospinning. The adhesive component, when present, is blended in the spinnable material solution prior to electrospinning. The spinnable material is used as a carrier for the adhesive component.

Based on the above, the stickiness, dryness and tackiness can be fine-tuned during the solution blending process.

In one or more embodiments, the spinnable liquid is devoid of an additional adhesive component.

In one or more embodiments, a non-woven has an adhesion energy of 200 mJ/m$^2$ or higher. In other embodiments, a non-woven has an adhesion energy of 300 mJ/m$^2$ or higher.

In one or more embodiments, the adhesive component results in a non-woven having a shear adhesion strength of 22 N/cm$^2$ or higher. In other embodiments, the adhesive component results in a non-woven having a shear adhesion strength of 27 N/cm$^2$ or higher.

In one or more embodiments, a non-woven has a shear adhesion strength of 40 N/cm$^2$ or higher. In one or more embodiments, a non-woven has a shear adhesion strength of 45 N/cm$^2$ or higher. In other embodiments, a non-woven has a shear adhesion strength of 50 N/cm$^2$ or higher. In other embodiments, a non-woven has a shear adhesion strength of 55 N/cm$^2$ or higher. In other embodiments, a non-woven has a shear adhesion strength of 60 N/cm$^2$ or higher.

In one or more embodiments, a non-woven has a shear adhesion strength greater than the tear strength of a face stock that the non-woven is positioned on. This is evident when, during testing, the face stock exhibits a failure, such as tearing, before the non-woven reaches a point of failure.

The suitable adhesive component could be dissolved in the same solvents which are used to dissolve the spinnable polymer. Solvents that are particularly beneficial for dissolving adhesive components include toluene, THF, DCM, chloroform, methanol, DMAC, DMSO, DMF, and xylene.

Certain properties of the nanofibers can be controlled in order to tailor the adhesion strength. These properties include fiber diameter (d) and fiber surface roughness. The properties of a non-woven that is formed from the nanofibers can also be controlled in order to tailor the adhesion strength. These properties include bending stiffness (b), non-woven thickness (T), loading angle, and molecular orientation. The properties of both the fibers and the fiber mats can have an effect on the adhesion strength and friction coefficient ($\mu$) of the fiber mats.

Generally, as the fiber diameter decreases, the bending moment and thus bending stiffness decrease. Similarly, as the fiber diameter increases, the bending moment and thus bending stiffness increase. The bending stiffness of the non-woven critically influences the shear adhesion strength measured. In a method including utilizing a rotating drum collector, the diameter of the nanofiber can be controlled through the take-up velocity (TUV) of the drum.

In one or more embodiments, the fiber diameter is less than or equal to 10 microns. In other embodiments, the fiber diameter is less than or equal to 1 micron, in other embodiments, the fiber diameter is less than or equal to 500 nanometers, in other embodiments, the fiber diameter is less than or equal to 100 nanometers, and in other embodiments, the fiber diameter is less than or equal to 50 nanometers. In one or more embodiments, the fiber diameter is from 50 nanometers or more to 1000 nanometers or less. In one or more embodiments, the fiber diameter is from 50 nanometers or more to 500 nanometers or less.

Electrospinning a spinnable solution, as disclosed herein, yields non-woven fabrics of aligned nanofibers. As suggested above, the non-woven fabric can also be described as a plurality of fibers, a plurality of fiber segments, a fiber array, or a fiber mat. The surfaces of the non-woven fabric are defined by many generally aligned nanofibers, as generally seen in the image of FIG. 1. The nanofibers, being of such nanoscopic diameters, are able to be received in the mating space of another group of nanofibers. The aligned nanofibers possess great flexibility, which allows the fibers to conform to the mating space. Thus, the non-woven can serve as a dry adhesive. In one or more embodiments, the non-woven can be wrapped around an object for securing the object.

Where two pluralities of fibers are joined, the architecture of the first non-woven and the fibers thereof should be tailored to be comparable to the dimensions of the second non-woven and the fibers thereof. That is, the sizes of the fibers of the first non-woven should be such that they fit in the void spaces of the second non-woven.

The thickness of a non-woven or fiber mat might be optimized for a given application. In one or more embodiments, the thickness of a non-woven is from 1 micrometer or more to 1 millimeter or less. In other embodiments, the thickness of a non-woven is from 1 micrometer or more to 10 micrometers or less, in other embodiments, from 0.1 micrometer or more to 1 micrometer or less. In one or more embodiments, the thickness of a non-woven is less than 2 millimeters.

A fiber mat of the present invention generally has higher shear adhesion while also having generally lower normal adhesion strength. Dry adhesives and non-wovens of the present invention have generally higher shear adhesion while also having generally lower normal lifting force. Shear adhesion is the adhesion strength measured in a direction that is coplanar with a cross section of the material, in other words, the adhesion strength measured in a direction that is generally parallel to the surface of the material. Normal adhesion strength, or normal lifting force, is the adhesion strength measured in a direction that is generally perpendicular with the surface of the material. A large difference between shear adhesion and normal adhesion is desired in order to easily switch between attachment of the adhesive and detachment. This property of the fiber mat allows the fiber mat to be removable, repositionable, and reusable. That is, the fiber mat can be attached and detached a number of times without failure and without residue being left on an adherend surface.

In one or more embodiments, a fiber mat has a shear adhesion strength that is at least 500% higher than normal adhesion strength. In one or more embodiments, a fiber mat has a shear adhesion strength that is 1000% or more higher than normal adhesion strength. In one or more embodiments, a fiber mat has a shear adhesion strength that is 2000% or more higher than normal adhesion strength. In one or more embodiments, a fiber mat has a shear adhesion strength that is at least 3000% higher than normal adhesion strength.

A fiber mat or dry adhesive as provided herein can be characterized by the quantified alignment of the fibers thereof. Such quantification can be the angle that the fibers extend through, a distribution calculation of the amount of fibers that are aligned using the angular power spectrum, percentage of alignment, also referred to as the density of alignment, and surface area coverage of a face stock.

A fiber mat or dry adhesive as provided herein can be characterized by the angle at which the fibers extend. For a reference point, a fiber extending parallel with the direction of extension is considered to be extending at 90 degrees. It can also be said that the reference angle of 90 degrees is the direction of formation when electrospun fibers are applied to a surface, such as a roller or conveyer. In one or more embodiments, substantially all of the fibers extend at angles between 80 degree and 100 degrees. In one or more embodiments, at least 90 percent of the fibers extend at angles between 80 degrees and 100 degrees. In one or more embodiments, at least 80 percent of the fibers extend at angles between 80 degrees and 100 degrees. In one or more embodiments, substantially all of the fibers extend at angles between 85 degree and 95 degrees. In one or more embodiments, at least 90 percent of the fibers extend at angles between 85 degrees and 95 degrees. In one or more embodiments, at least 80 percent of the fibers extend at angles between 85 degrees and 95 degrees.

A fiber mat or dry adhesive as provided herein can be characterized by the degree of alignment of the fibers using 2-dimensional fast Fourier transform (2D FFT) analysis of SEM images. 2D FFT provides a reliable and straightforward way to measure fiber alignment in electrospun fibers. 2D FFT has been used widely and accepted as a standard method for evaluating alignment. A FFT frequency distribution constructs a plot of normalized intensity versus alignment angle. It can be said that an FFT analysis of a data image containing randomly aligned fibers generates an output image containing pixels distributed in a symmetrical, circular shape. This distribution occurs because the frequency at which specific pixel intensities occur in the data image is theoretically identical in any direction. In contrast, the FFT analysis of a data image containing aligned fibers results in an output image containing pixels distributed in a non-random, elliptical distribution. This distribution occurs because the pixel intensities are preferentially distributed with a specific orientation. Further information regarding FFT analysis is disclosed in the reference article "Modulation of anisotropy in electrospun tissue-engineering scaffolds: Analysis of fiber alignment by the fast Fourier transform" by Ayres et al. from Biomaterials November 2006 (Online Jul. 21, 2006), which is incorporated herein by reference.

This quantification results in a distribution graph where the angle of alignment is the x-axis and the normalized intensity (frequency) is the y-axis. In one or more embodiments, the distribution graph includes a frequency peak at 90 degrees of at least 0.40. In one or more embodiments, the distribution graph includes a frequency peak at 90 degrees of at least 0.70. In one or more embodiments, the distribution graph includes a frequency peak at 90 degrees of at least 0.80.

Furthermore, the sharpness of the frequency peak at 90 degrees is representative of the uniformity of alignment. The sharper the peak at 90 degrees, the more area occupied between the specific degree range under the frequency peak. In one or more embodiments, the distribution graph includes at least 70 percent of the area under the curve between the angles of 80 degrees and 100 degrees. In one or more embodiments, the distribution graph includes at least 85 percent of the area under the curve between the angles of 80 degrees and 100 degrees. In one or more embodiments, the distribution graph includes at least 90 percent of the area under the curve between the angles of 80 degrees and 100 degrees. In one or more embodiments, the distribution graph includes at least 70 percent of the area under the curve between the angles of 85 degrees and 95 degrees. In one or more embodiments, the distribution graph includes at least 85 percent of the area under the curve between the angles of 85 degrees and 95 degrees. In one or more embodiments, the distribution graph includes at least 90 percent of the area under the curve between the angles of 85 degrees and 95 degrees.

A fiber mat or dry adhesive as provided herein can be characterized by the percentage of fibers that are substantially aligned. The percentage of fibers that are substantially aligned can also be referred to as the density of alignment. In one or more embodiments, substantially all of the fibers are substantially aligned. In one or more embodiments, at least 98 percent of the fibers are substantially aligned. In one or more embodiments, at least 95 percent of the fibers are substantially aligned. In one or more embodiments, at least 85 percent of the fibers are substantially aligned. In one or more embodiments, at least 70 percent of the fibers are substantially aligned.

Where a fiber mat or dry adhesive as provided herein includes a face stock, the fiber mat or dry adhesive can be characterized by the surface area coverage of the fiber mat or dry adhesive when compared to the face stock. That is, if the surface area of the face stock is taken as a 100 percent reference point, the percentage of that 100 percent reference point being covered by a fiber mat or dry adhesive can be said to be the surface area coverage.

In one or more embodiments, the surface area coverage of a face stock by a fiber mat or dry adhesive is 100 percent or approximate thereto. In one or more embodiments, the surface area coverage of a face stock by a fiber mat or dry adhesive is at least 95 percent. In one or more embodiments, the surface area coverage of a face stock by a fiber mat or dry adhesive is at least 85 percent. In one or more embodiments, the surface area coverage of a face stock by a fiber mat or dry adhesive is at least 80 percent. In one or more embodiments, the surface area coverage of a face stock by a fiber mat or dry adhesive is at least 70 percent.

The fiber properties described herein can be measured using digital image processing techniques as are known to those skilled in the art. An exemplary digital image processing technique includes the use of the Fourier power spectrum method. An exemplary software utilizing a digital image processing technique is the ImageJ software from National Institutes of Health.

The nanofibers and fiber mat formed therefrom may also be characterized by the glass transition temperature ($T_g$) of the one or more polymeric materials used to make the nanofibers. The glass transition temperature can be described as the reversible transition in amorphous materials from a hard and relatively brittle state into a molten or rubber-like state. It can also be said that materials having a lower glass transition temperature are generally more "wet." Generally, forming a fiber mat from a polymeric material that is less "wet" will give the fiber mat improved reusability properties. Generally, forming a fiber mat from a polymeric material that is more "wet" will give the fiber mat improved intimate contacts due to flow. These properties can be balanced based on the desired application.

In one or more embodiments, the one or more polymeric materials used to make the nanofibers has a glass transition temperature less than ambient temperature. In one or more embodiments, the one or more polymeric materials used to make the nanofibers has a glass transition temperature greater than ambient temperature. It can be said that a polymer with a glass transition temperature less than ambient temperature is considered to behave in liquid state at room temperature. It can be said that a polymer with a glass transition temperature higher than ambient temperature is considered to behave in solid state at room temperature.

As used herein, mechanical interlock is defined as fiber segments or fibers entering the void space between other fiber segments or fibers. The void space can also be referred to as mating space, as the fiber segments or fibers are matingly received in the mating space and held together. It can also be said that the fiber segments or fibers are mutually complementary with the void space. For example, a first plurality of fibers can include void spaces between the fibers. To form a mechanical interlock, at least a portion of a second plurality of fibers is allowed to enter the void spaces between the fibers of the first plurality of fibers. A general schematic of mechanical interlocking is provided in FIG. 9, although it should be appreciated that in the nanofiber scale, the first plurality of fiber segments or fibers is in immediate proximity with the second plurality of fiber segments or fibers upon becoming mechanically interlocked.

The mechanical action of the mechanical interlock described herein can be said to be similar to hook and loop fasteners, such as Velcro™. As such, a dry adhesive as described herein can be used in similar applications as hook and loop fasteners. However, fiber mats described herein offer one or more improvements over such hook and loop fasteners, such as improved reusability.

The intimate contact between the two pluralities of nanofibers can be maximized by three factors: (i) improved alignment of nanofibers, (ii) higher surface area based on the nanoscale size of the fibers, and (iii) increased flexibility of the nanofibers, allowing the nanofibers to be easily conformable. As such, the strength of the interlocks can be increased by choosing viscoelastic polymers and their derivatives as the base materials for forming the nanofibers.

Mechanical interlocking can also be defined as the first plurality of fiber segments or fibers having nano-scale protrusions extending from the first plurality. The second plurality of fiber segments or fibers can be said to have nano-scale void spaces within the second plurality. Based on this definition of mechanical interlocking, a mechanical interlock is formed by the nano-scale protrusions filling nano-scale void spaces.

Figure 10:
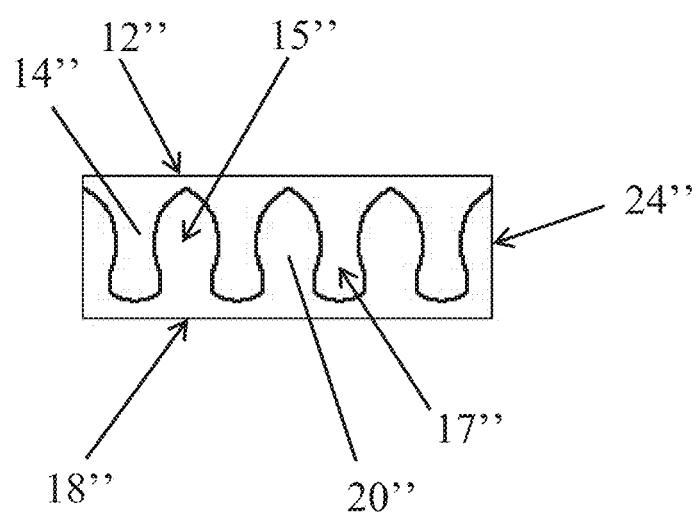
FIG. 10 is a schematic showing a cross section of mechanically interlocked fibers.

Referring now to FIG. 10, a cross-sectional schematic representation of mechanical interlocking is represented. A first fiber mat, generally indicated by the numeral 12", includes a plurality of substantially aligned fibers 14" having void spaces 15" therebetween. A second fiber mat, generally indicated by the numeral 18", includes a plurality of substantially aligned fibers 20" having void spaces 17" therebetween. To form mechanical interlocking between substantially aligned fibers 14" and substantially aligned fibers 20", first fiber mat 12" is brought into intimate contact with second fiber mat 18". Substantially aligned fibers 14" of first fiber mat 12" are mechanically interlocked with substantially aligned fibers 20" of second fiber mat 18" based on substantially aligned fibers 14" entering void spaces 17" between substantially aligned fibers 20". Similarly, substantially aligned fibers 20" enter void spaces 15" between substantially aligned fibers 14". The mechanical interlock occurs at a mechanical interlock region, generally indicated by the numeral 24".

Where one or more face stocks are described herein, suitable face stocks can include metal substrates, aluminum foil, polymer films, polyethylene terephthalate films, woven polyester fibers, paper materials, laminates, and carbon fibers. In one or more embodiments, a dry adhesive includes a release liner. In one or more embodiments, a desired face stock is chosen based on the polymer that is used to make the nanofibers.

Figure 7:
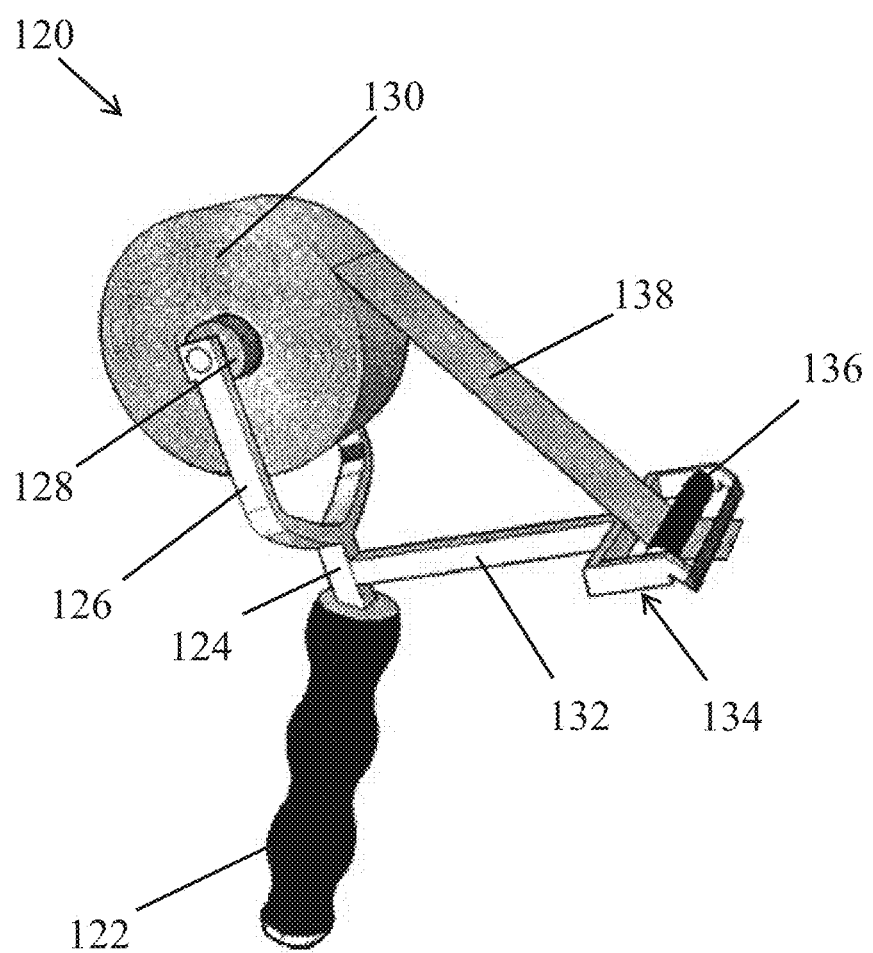
FIG. 7 is a perspective view of an applicator for applying a dry adhesive made from a plurality of aligned fibers.

Referring now to FIG. 7, an applicator for applying a dry adhesive is shown and generally designated by the numeral 120. Applicator 120 includes a handle 122 with a main arm 124 extending therefrom. Main arm 124 terminates at an end, where two holder arms 126 extend therefrom in a horseshoe-type shape. A distal end of each holder arm 126 is coupled to an internal roller 128 that carries a fiber mat roll 130 therearound.

An applicator arm 132 extends from a middle portion of main arm 124. A distal end of applicator arm 132 carries an applicator, generally indicated by the numeral 134. Applicator 134 comprises an applicator roll 136.

Fiber mat roll 130 comprises a length of fiber mat rolled on itself as to form a cylinder having a central hole therethrough. The central hole receives roller 128 as to position fiber mat roll 130 in applicator 120. Fiber mat roll 130 has a fiber mat application portion 138 extending therefrom and to applicator 134. Fiber mat application portion 138 extends underneath applicator roll 136 in order to be applied to the surface of a substrate. Advantageously, applicator roll 136 can be used to press fiber mat application portion 138 against the surface of a substrate, where the fiber mat application portion 138 will stick for reasons described herein. Applicator roll 136 can also be said to be used for removing air from the fiber mat application portion 138 upon being applied to the surface of a substrate. In one or more embodiments, fiber mat roll 130 comprises a release substrate (not shown) that is peeled from fiber mat application portion 138 before applying fiber mat application portion 138 to the surface of a substrate. Once all of a fiber mat roll 130 has been applied, a new fiber mat roll 130 can be supplied to applicator 120.

Another exemplary applicator is a laminating knife as known by those skilled in the art. As suggested above, a function of an applicator is to rub out air trapped in between nanofibers, enhancing the intimate contacts between the mating faces. This is an improvement over randomly orientated fiber mats, where it is difficult or not possible to remove the air. The trapped air can then cause cracks and delamination of the adhesive from the adherend. In one or more embodiments, a dry adhesive can be said to be airtight.

A dry adhesive formed as described herein may be useful in household applications, biomedical applications, aerospace applications, microelectronic fabrication, wafer fabrication, coatings, advertising, films or labels, robotics applications, textiles and apparels, automotive applications, and as adhesives. A dry adhesive may be used as a high temperature adhesive, where polymers capable of withstanding high temperature are utilized.

Based on the mechanism of the mechanical interlock described herein, a dry adhesive as described herein can be used underwater and in aqueous environments. The mechanical interlock remains secured even in these environments.

A method of securing a first substrate with a second substrate can include first steps of providing a first substrate having a plurality of substantially aligned fiber segments having void spaces therebetween and providing a second substrate having a plurality of substantially aligned fiber segments having void spaces therebetween. The pluralities of substantially aligned fiber segments can be directly applied to the first substrate and the second substrate. The substantially aligned fiber segments of the first substrate are allowed to become intimately positioned with the void spaces of the second substrate. The substantially aligned fiber segments of the second substrate are allowed to become intimately positioned with the void spaces of the first substrate. This forms a mechanical interlock utilizing the fiber segments of the first substrate and the fiber segments of the second substrate. The air can be removed, as by pressing or rolling out the air, as to further secure the mechanical interlock.

Figure 11:
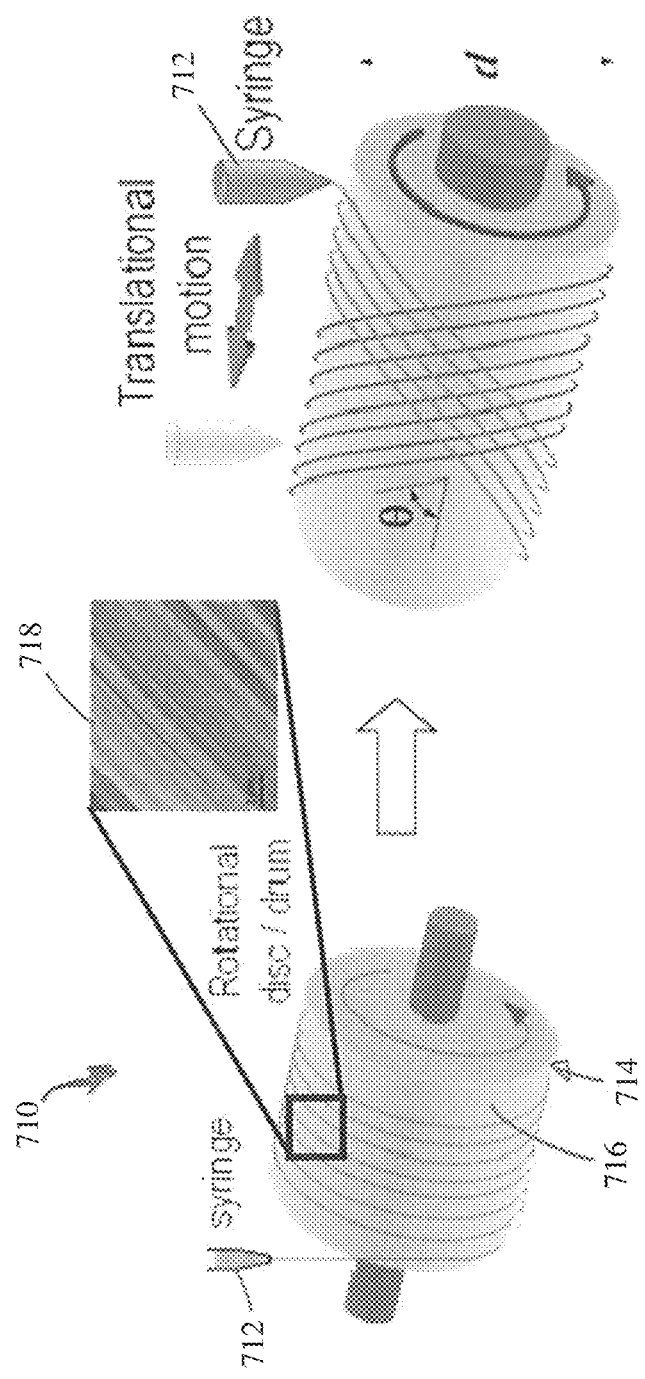
FIG. 11 is a schematic showing an electrospinning apparatus where a disc or drum is used for creating non-woven fabrics with aligned nanofibers.

Referring now to FIG. 11, an electrospinning apparatus for creating non-woven fabrics with aligned nanofibers is shown and designated by the numeral 710. The apparatus 710 includes a spinneret 712 holding the spinnable liquid for electrospinning. The spinneret is directed toward a drum or disc collector 714 providing a peripheral collecting surface 716. The designation as a drum collector typically relates to the collector having a collecting surface 716 that is of a more substantial axial length, whereas designation as a disc collector typically relates to the collector having a very narrow collecting surface, i.e., a more sharp edge. Generally, the advantage of utilizing a rotating disc collector compared to the rotating drum collector is that most of the fibers are collected in an aligned fashion on the sharp-edged disc.

The disc or drum collector 714 rotates as the jet of charged liquid is drawn toward the collecting surface, and, as a result, the collected fiber tends to align in the direction of rotation. In some embodiments, such as that shown to the right in FIG. 11, the spinneret 712 moves back and forth across the axial length of the collecting surface to achieve a more helical winding of the nanofibers and create a non-woven with aligned fibers in a helical arrangement. In either embodiment, the rotational collector rotates and the nanofibers form in such a way that the nanofibers are aligned to be substantially parallel with other nanofibers as the rotational collector rotates. It will be appreciated that the alignment is general in nature and not absolute perfect alignment as the jet collecting on the collecting surface bends and whips back and forth to some degree under what is known as bending instability. Nevertheless the collected fibers are understood as being aligned as opposed to randomly collected. This is shown in FIG. 11 at the electron micrograph 718 therein, which shows aligned nanofibers.

In the method of utilizing a rotating drum collector, the diameter of the nanofiber can be controlled through the take-up velocity (TUV) of the drum. The alignment of the fibers is induced by the rotating drum and the degree of fiber alignment improves with the rotational speed. Randomly oriented fibers are obtained on the drum at TUV lower than the fiber TUV. At higher TUV, the fibers extend before being collected on the drum due to a centrifugal force which is developed on the surface of the rotating drum.

Figure 12:
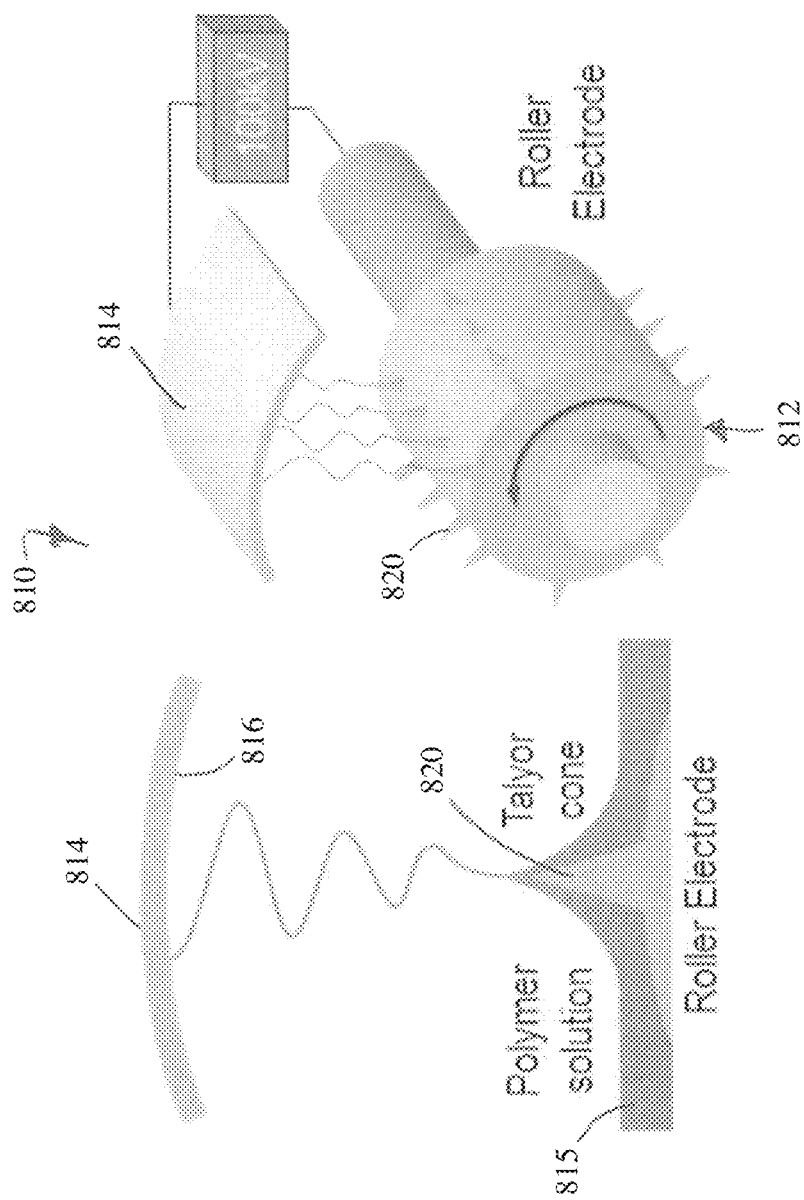
FIG. 12 is a schematic showing an electrospinning apparatus for creating non-woven fabrics with aligned nanofibers, the apparatus having a roller electrode that includes a multitude of protrusions.

Referring now to FIG. 12, an electrospinning apparatus for creating non-woven fabrics with aligned nanofibers is shown and designated by the numeral 810. This embodiment employs a roller electrode 812, serving a similar function as compared to the spinneret of the prior apparatus. The roller electrode 812 rotates (as generally shown by the rotational arrow in the figure) partially submerged in a spinnable solution 815 and underneath a collector 814. The roller electrode 812 includes a multitude of protrusions 820, which become coated with the spinnable solution 815. The electrode is charged to charge the spinnable solution so that Taylor cones form and the spinnable solution jets to the collector. Because the roller electrode is rotated, the fiber is drawn and aligned. The collector 814 can be curved to retain a consistent distance between the tips of the protrusions 820 and the collecting surface 816 of the collector 814. The collector 814 can be made to rotate as well to draw fibers and further enhance alignments.

Figure 13:
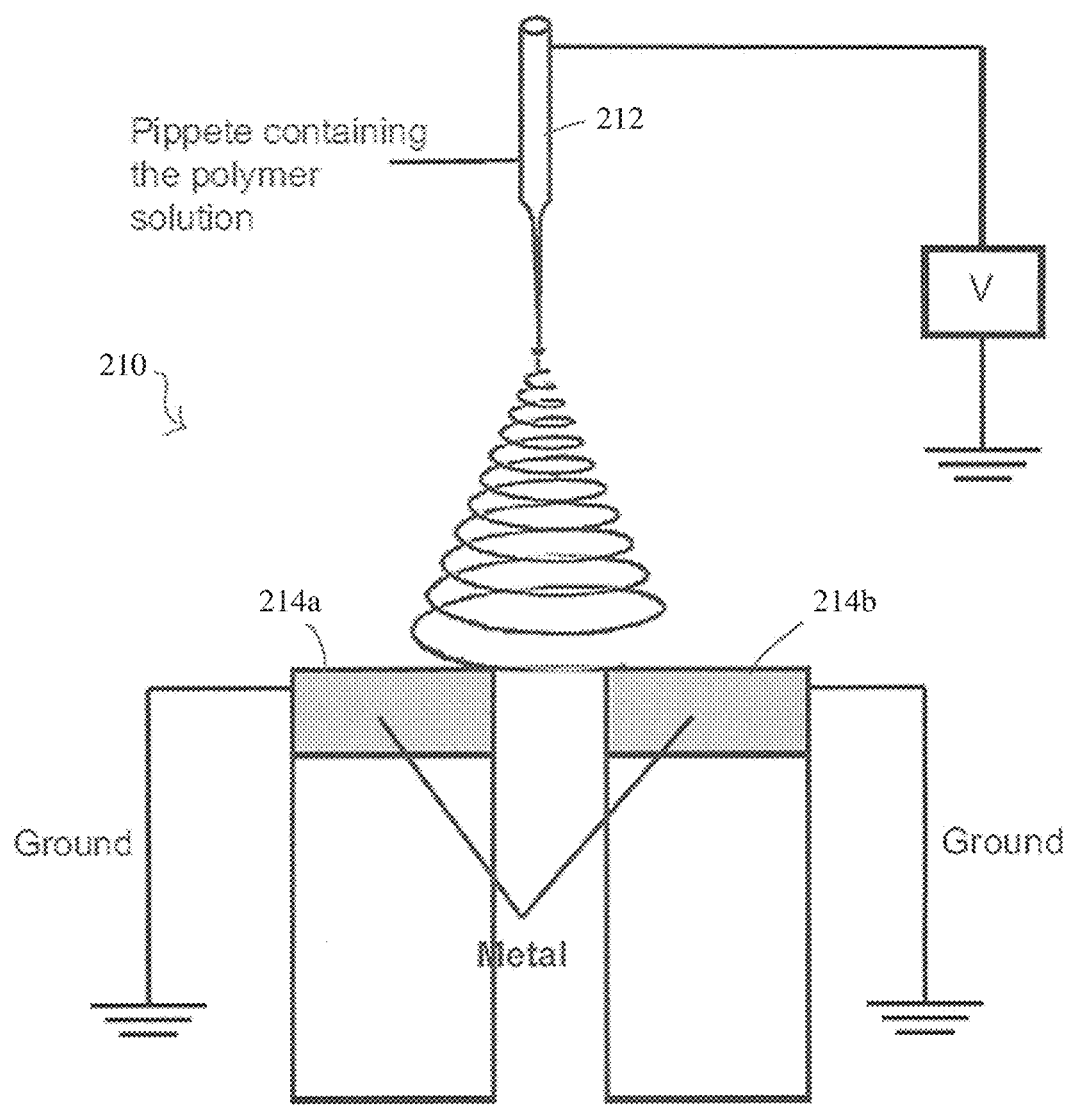
FIG. 13 shows a general schematic of a static parallel electrode electrospinning apparatus.

Referring now to FIG. 13, a static parallel electrode electrospinning apparatus is shown and designated by the numeral 210. The apparatus 210 includes a collector in the form of first and second collector electrodes 214a, 214b, and the spinneret 212. Nanofibers are collected across an air gap between the first and second collector electrodes 214a, 214b. An electric field produced between the electrodes causes fibers to align perpendicular to the electrodes. The fibers are stretched as they form. The advantage of this method is that the setup is simple. Also, it is easy to collect single fibers and several aligned fibers for mechanical testing.

The nanofibers, being of such nanoscopic diameters, are able to conform readily to surface asperities and serve as contact points with not only the macroscopic but also the micro- and nanoscopic asperities on the surface of an adherend.

The aligned nanofibers possess great membrane flexibility, which allows the fibers to conform to surface asperities, thereby producing intermolecular interactions such as van der Waals forces that secure the non-woven to the surface of the adherend. Thus the non-woven can serve as a dry adhesive, adhering to the surface of an adherend and, in some embodiments, further securing the adherend to another surface.

In one or more embodiments, a dry adhesive having a hierarchical structure is produced. The adhesion performance of hierarchical structure adhesives is expected to be superior to adhesives lacking hierarchical structures. This is because enhanced packing density augments van der Waals forces between fiber arrays and a substrate, which increases the shear adhesion strength between the hierarchical structure and the substrate.

The hierarchical structures can be produced, for example, by passing aligned electrospun fibers through an equal channel extrusion vial.

The architecture of the non-woven and the fibers thereof should be tailored to be comparable to the dimensions of surface asperities and the topology of the target adherend. When the asperities are smaller, smaller fiber diameters and filaments are generally desired.

Figure 14:
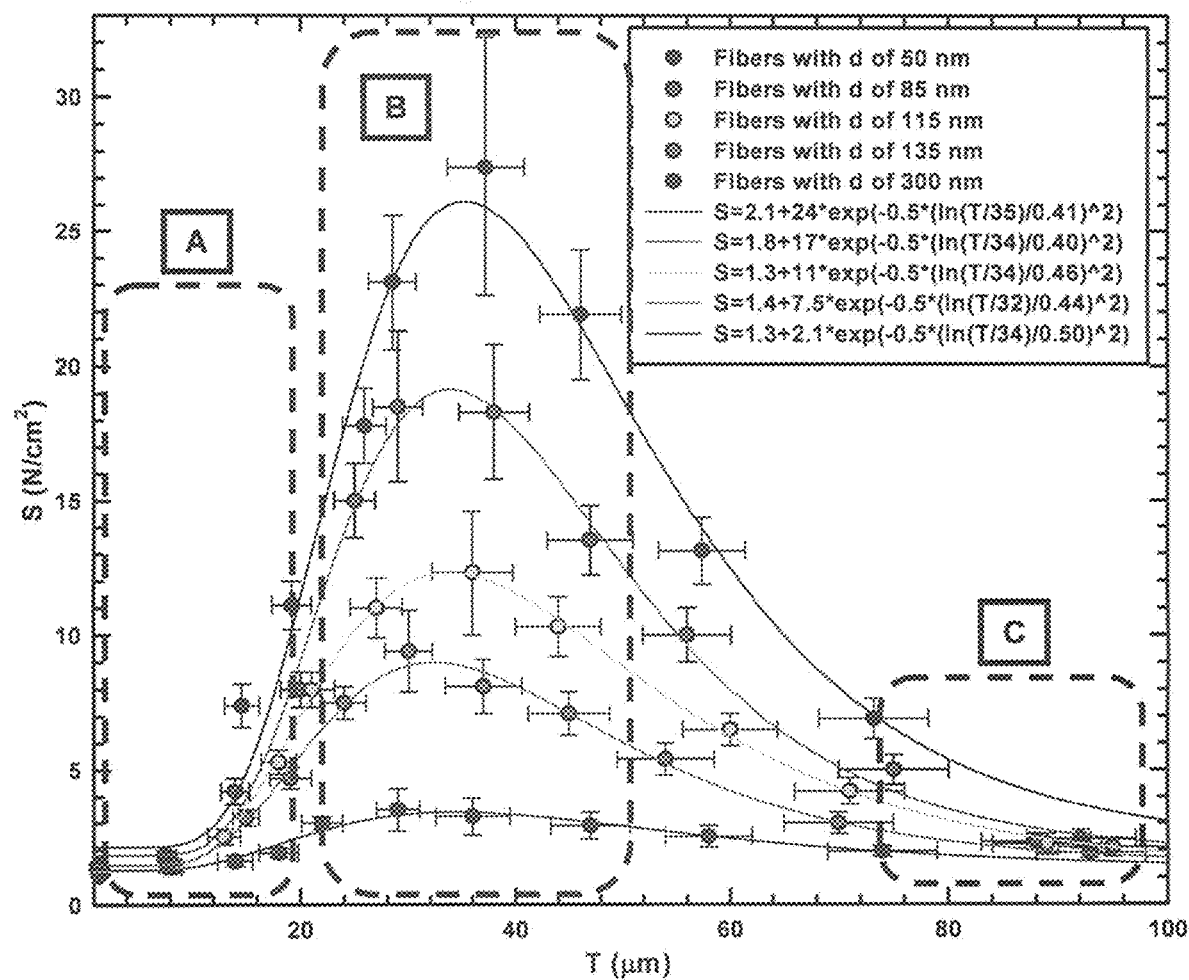
FIG. 14 is a graph showing shear adhesion strength as a function of T and fiber diameter for aligned fiber membranes attached onto a glass slide.

FIG. 14 shows one example of the effect of fiber diameter and non-woven thickness on shear adhesion strength. Each generally parabolic plot represents fibers of different diameters. It can be seen that the fibers of smaller diameter provide higher shear adhesion strength. The smaller diameters allow the fibers to better conform to the asperities on the adherend surface, thus increasing intermolecular interactions such as van der Waals forces. The shear adhesion strength peaks for non-woven thickness, and it is understood that a transition occurs from a plane strain to a plane stress (Polymer Blends; Mai, Wong, and Chen; 2000; which is incorporated herein by reference) such that the thinner non-wovens provide less shear adhesion strength because there is too little ligament to provide for intermolecular interactions such as van der Waals forces. It is further understood that the thicker non-wovens cannot conform to the asperities and thus shear adhesion decreases after a preferred thickness for a given adherend.

Generally, as the non-woven thickness decreases, the bending moment and thus bending stiffness decrease. Similarly, as the non-woven thickness increases, the bending moment and thus bending stiffness increase. The bending stiffness of the non-woven critically influences the shear adhesion strength measured.

Thickness might be optimized for a given non-woven and target adherend. Thinner non-wovens will interact better with increasingly smaller asperities on the surface of the adherend. In one or more embodiments, the non-woven (or membrane) is from 10 micrometers or more to 100 micrometers or less. In other embodiments, the non-woven is from 1 micrometer or more to 10 micrometers or less, in other embodiments, from 0.1 micrometer or more to 1 micrometer or less.

In one or more embodiments, a non-woven is produced from PVDF with a fiber diameter of from 270 nm or more to 400 nm or less, a membrane thickness of about 10 µm, and a work of adhesion from 180 mJ/m$^2$ or more to 350 mJ/m$^2$ or less. In one or more embodiments, a non-woven is produced from PCL with a fiber diameter of from 200 nm or more to 300 nm or less, a membrane thickness of about 10 µm, and a work of adhesion from 260 mJ/m$^2$ or more to 350 mJ/m$^2$ or less.

In one or more embodiments, a non-woven is produced from nylon 6 with a fiber diameter of from 50 nm or more to 300 nm or less, a membrane thickness of from 15 µm or more to 100 µm or less, and a shear adhesion strength of about 27 N/cm$^2$. In these embodiments and other embodiments, the shear adhesion strength of a non-woven substantially increases as the fiber thickness rises from one threshold to a second threshold. After the fiber thickness becomes greater than the second threshold, the shear adhesion strength of a produced non-woven is significantly reduced.

In particular embodiments, as the fiber thickness increases from 15 µm to 40 µm, the shear adhesion strength of the non-woven substantially increases and reaches a maximum value. In these and other embodiments, for thicknesses greater than 40 µm, the shear adhesion strength of a produced non-woven is reduced.

In one or more embodiments, a non-woven is produced from PCL with a fiber radius of from 0.35 µm or more to 1.2 µm or less, and an adhesion energy from 180 mJ/m$^2$ or more to 200 mJ/m$^2$ or less.

Figure 16:
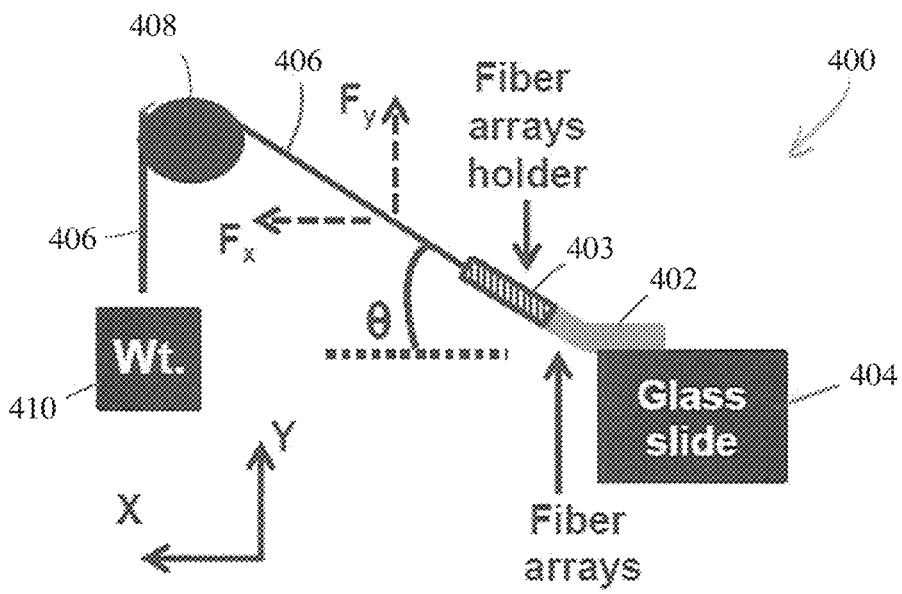
FIG. 16 is a general schematic of an apparatus and test method for testing the shear adhesion strength.

With reference to FIG. 16, an apparatus for assessing the shear adhesion of the non-wovens is shown and designated by the numeral 400. The non-woven 402 is secured to a fiber holder 403 and is press applied to the surface of an adherend 404 (glass slide shown as an example only) such that a portion thereof extends off of the surface so that the overhanging portion can be pulled at a desired angle. A suitably strong string or cable 406 extends from the holder 403, over a pulley 408 positioned so as to pull the non-woven at a desired angle θ creating a shear vector Fx and a normal vector Fy (for angles between 0 and 90). An adjustable weight 410 is secured to the opposite end of the cable 406 so as to be incrementally increased until there is an adhesion failure or break of the non-woven. In particular embodiments, the weight 410 is a container that receives liquid so as to be varied in weight. Liquid is slowly and continually added and the total weight of the container and liquid therein can be determined after failure.

Figure 24:
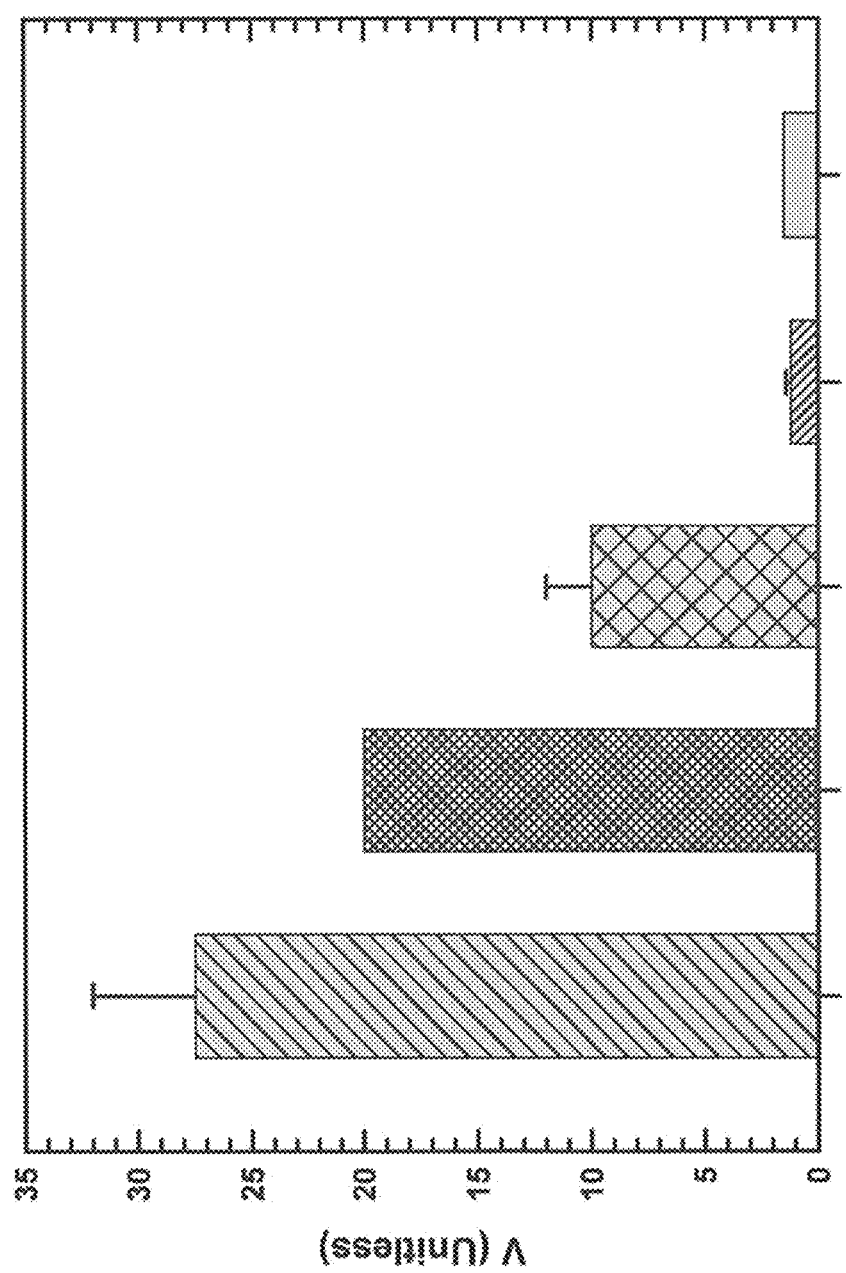
FIG. 24 is a bar graph comparing the adhesion of an example of the present invention (nylon 6 non-woven) to some common prior art, including gecko feet, Scotch™ brand tape, carbon nanotubes and PUA.

Referring to FIG. 24, a bar graph is provided to compare the adhesion of an example of the present invention to some common prior art. The vertical axis is a unitless property V, calculated through the process of FIG. 16, with V being the adhesion strength at θ of 0 degrees divided by the adhesion strength at θ of 30 degrees. This provides a unitless comparison of shear and normal adhesion, in that pulling at 0 degrees is pure shear adhesion, while pulling at 30 degrees tests both shear and normal adhesion. The left-most bar represents a nylon 6 non-woven of aligned nanofibers in accordance with this invention having a thickness of 30 microns with fibers of a diameter of 50 nm. From left to right, the additional bars represent gecko setae, common Scotch™ brand tape, carbon nanotube arrays and polyurethane acrylate (PUA) nanofibers. The present invention is found to provide great shear adhesion with a low normal adhesion such that non-wovens in accordance with this invention provide strong shear adhesion, while being readily removed from surfaces in a normal or peel direction.

Figure 22:
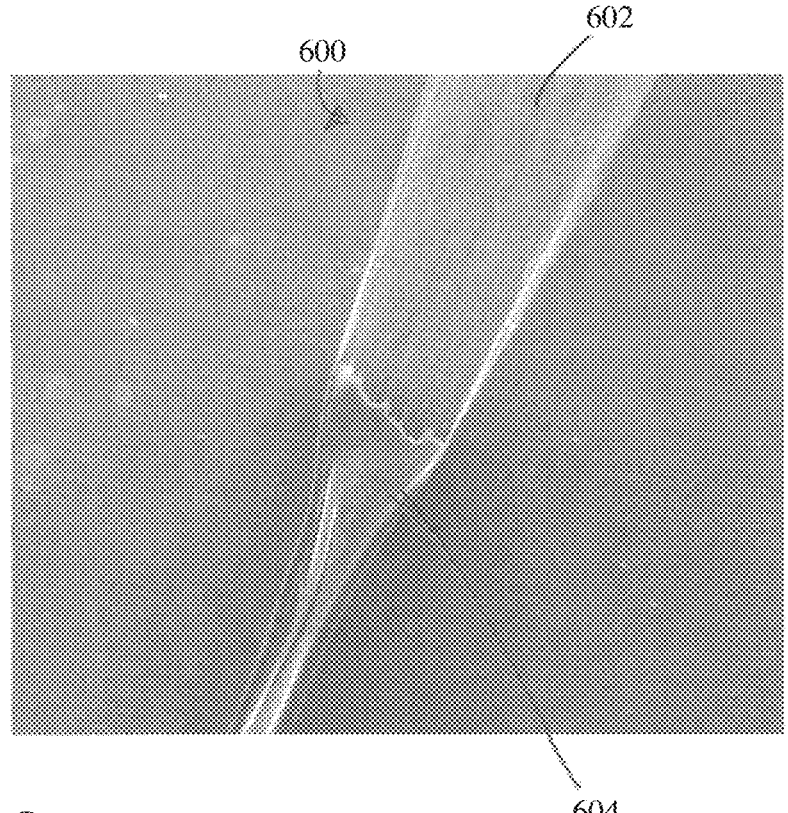
FIG. 22 is an image of a hierarchical structure in accordance with this invention with non-woven aligned fibers extending from and supported by a polycarbonate base.
Figure 23:
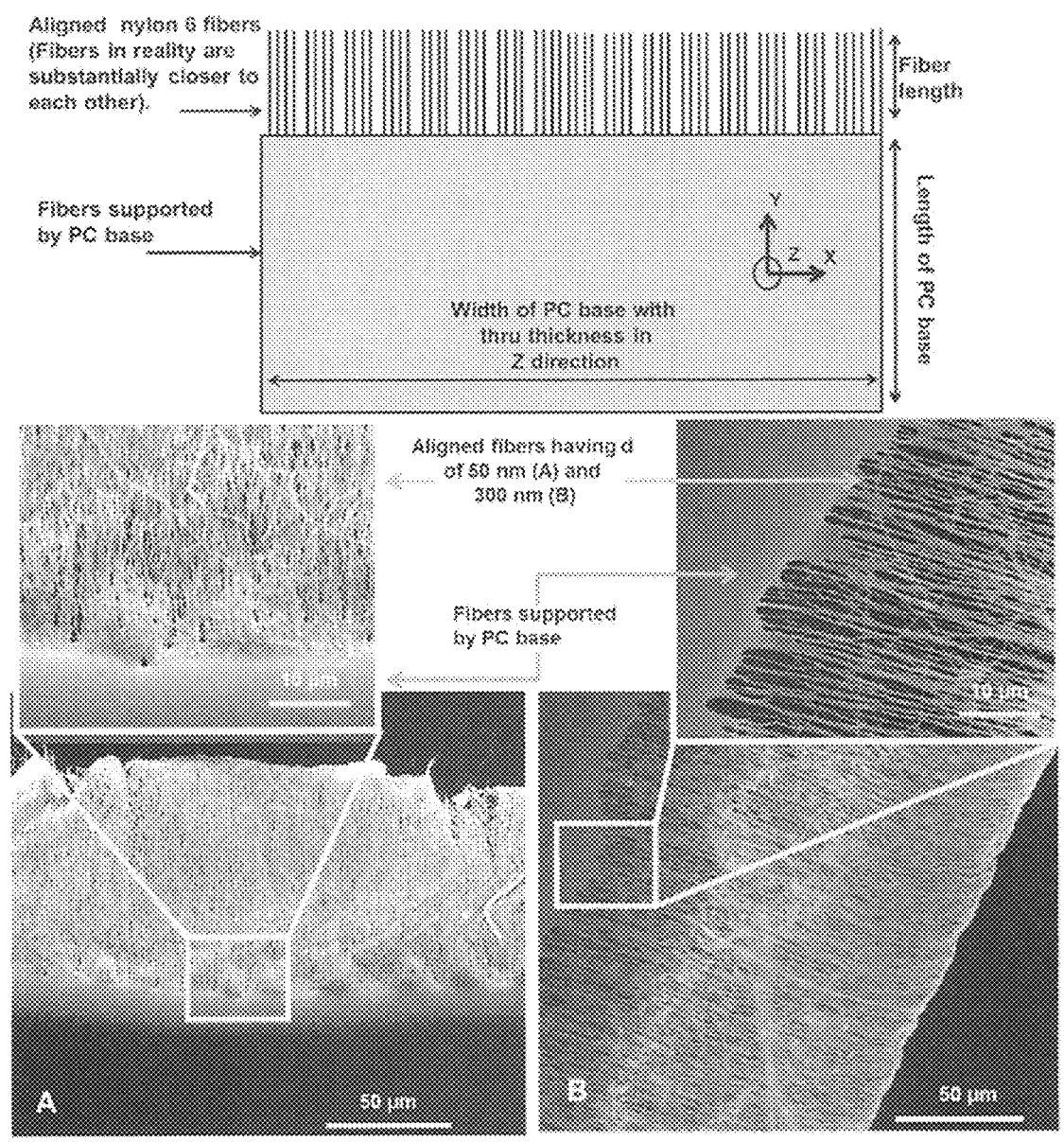
FIG. 23 provides a schematic representation and specific images of similar hierarchical structures with non-woven aligned fibers extending from and supplied by a polycarbonate base.

In some embodiments, the non-woven of aligned nanofibers can be incorporated into base structures to form hierarchical structures. For example, in FIG. 22, a hierarchical structure is shown and designated by the numeral 600. The hierarchical structure 600 includes a non-woven 602 in accordance with this invention extending from a base 604. Although any desired process for securing the non-woven to a larger base structure can be practiced, in some embodiments, an end of the non-woven 602 is placed in a settable material, such as a polycarbonate, while flowable, and thereafter the settable material is set to solidify and secure the non-woven extending therefrom in a hierarchical manner. Notably, this structure mimics hierarchical structures of fine fibrils like those on insects' and lizards' feet, the non-woven being similar to the spatulae and the base being similar to the seta. FIG. 23 shows a schematic and electron microscope images of similar hierarchical structures with non-woven aligned fibers extending from and supported by a polycarbonate base.

The dry adhesives formed using methods of the present invention achieve their adhesive properties through creation of nanoscale contact points. In some embodiments, tens of millions of nanoscale contact points are achieved. The alignment of fibers increases the adhesive properties of the dry adhesives. If the fibers are not aligned, they tend to stack randomly on top of each other and eliminate nanoscale contacts with the surface of the adherend.

In a specific embodiment using electrospun nylon 6 non-woven, a shear adhesion strength of about 27 N/cm$^2$ was achieved when testing with a glass slide. In this same embodiment, this measured value of the shear adhesion strength was about 97 times higher than the normal adhesion strength. These results indicate that the dry adhesive possesses strong shear binding-on and easy normal lifting-off.

In one or more embodiments, the non-woven forming the dry adhesive as disclosed above is plastically deformed in order to further tailor the adhesive properties. To distinguish the resultant product from the non-woven dry adhesive described above it is termed herein a non-woven substrate. Plastic deformation of the non-woven dry adhesive results in the formation of microprotrusions on the surface of the resultant non-woven substrate. As the nanofibers pass through the extrusion die their nano-morphology is further refined by severe plastic deformation. The nano-morphology is refined in order to provide the protruding microprotrusions with the original nanofiber texture being preserved.

The non-woven dry adhesive may be subject to severe plastic deformation through ball milling, torsion straining under quasi-hydrostatic pressure, equal-channel angular pressing and multiple forging. Suitable plastic deformation can also be achieved by simple pressing of the substrate between surfaces.

Figure 15:
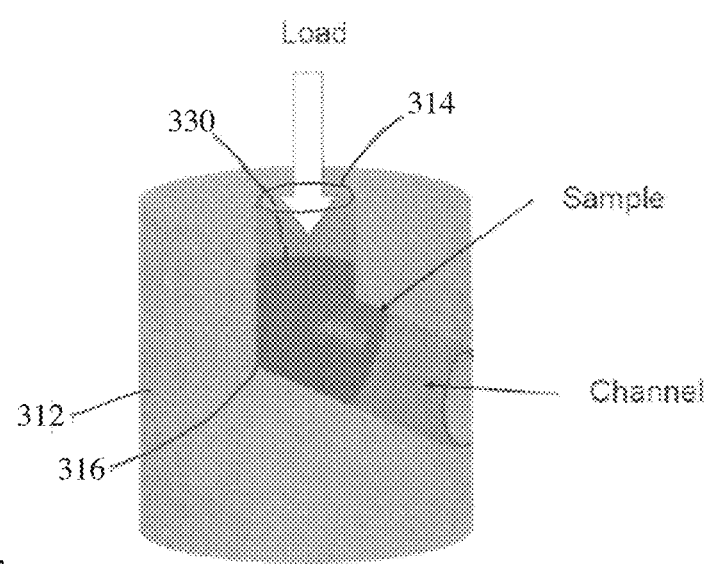
FIG. 15 shows a general schematic of an equal channel angular pressing method.

Referring now to FIG. 15, an equal channel angular pressing method is shown. An equal channel angular extrusion vial 312 includes a channel 314 including a corner 316. The cross section of the channel 314 is equal on entry and exit. The non-woven dry adhesive 330 is forced through the channel 314 and is subjected to high strain plastic deformation as it is forced around the corner 316. The plastic deformation creates micro- or nano-protrusions (herein broadly referred to as microprotrusions) in the form of fibrillar lamellar bundles which tend to orient approximately along the extrusion direction. Since the electrospinning preferably produces a continuous single fiber with one discharge of electrified solution, the aspect ratio of microprotrusions thus formed is governed by the geometry of the equal channel angular press and the number of cycles through the press. The higher the number of cycles, the higher the aspect ratio of the nano- and micro-protrusions.

Figure 17:
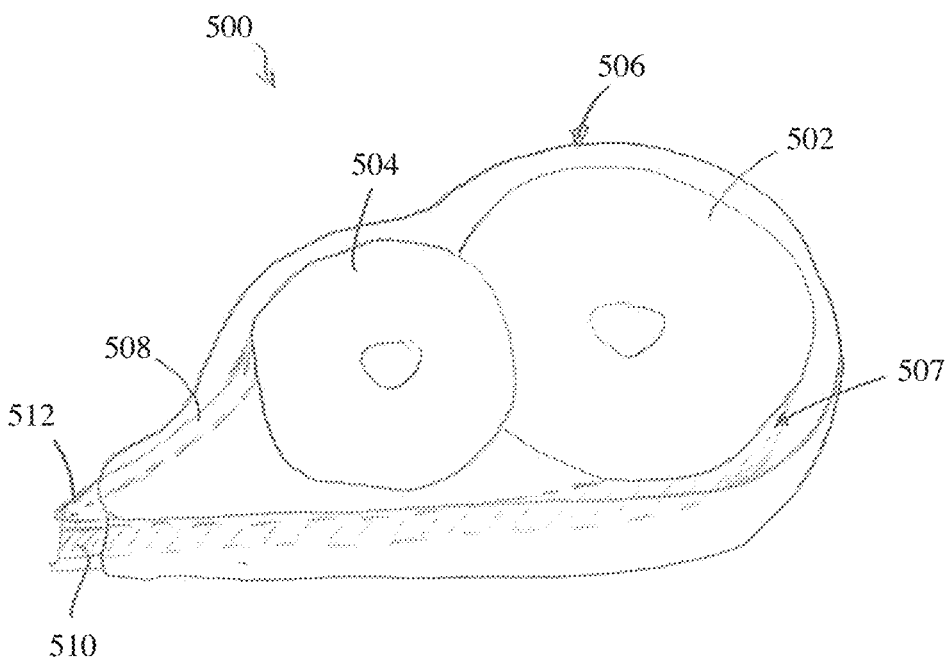
FIG. 17 shows an embodiment of an applicator for adhering non-wovens of aligned nanofibers in accordance with this invention to an adherend.

In a particular embodiment, the non-wovens of this invention, whether with or without an adhesive polymer component forming part of the nanofibers, are woven onto a release substrate on the collector. Thus, the non-woven can be peeled off of the release substrate and pressed onto the surface of an item for adhesion thereto and, if desired, for further adhesion of that item to another surface. With reference to FIG. 17, in particular embodiments, the non-wovens are part of an applicator 500 having a dry adhesive supply spool 502 and a release substrate take-up spool 504 held in an applicator body 506. The dry adhesive supply spool 502 carries a spooled supply 507 of release substrate 508 coated with a non-woven 510 in accordance with the disclosures above. The spooled supply 507 extends from the spool 502 over an applicator tip 512 and then is secured to the take-up spool 504. The non-woven is the outermost layer such that as the spooled supply 507 extends over the applicator tip 512, the release substrate 508 is against the tip 512 and the non-woven 510 is exposed. Thus, the applicator tip 512 can be used to press the non-woven 510 against the surface of an item, where the non-woven will stick for reasons described herein. Movement of the applicator body 506 leaves behind a line of non-woven 510, which peels off of the release substrate 508, the supply spool 502 rotating as the spooled supply 507 is pulled off. The take-up spool 504 and supply spool 502 are geared together such that the take-up spool 504 takes up the release substrate 508. These general applicators are known in the art of liquid paper application for correcting typographical errors and the like.

Developing reusable materials with higher friction coefficient ($\mu$) and shear adhesion strength also has the potential of use in several applications such as treads of wall-climbing robots, high-friction gloves, and fasteners.

In a specific embodiment, the polymeric material is PVDF, the solvent is a combination of DMF and acetone, and the concentration of the polymeric material is 0.17 g/mL. In another specific embodiment, the polymeric material is PVA, the solvent is a combination of DMSO and ethanol, and the concentration of the polymeric material is 0.19 g/mL. In another specific embodiment, the polymeric material is PVDF, the solvent is a combination of DMF and acetone, and the concentration of the polymeric material is from 0.15 g/mL to 0.20 g/mL. In another specific embodiment, the polymeric material is PCL, the solvent is a combination of $CHCl_3$ and DMF, and the concentration of the polymeric material is 0.12 g/mL.

In another specific embodiment, the polymeric material is Nylon 6, the solvent is formic acid, and the percentage of the polymeric material is from 12.5 wt % to 22.5 wt %. In another specific embodiment, the polymeric material is PCL, the solvent is a combination of DCM and DMF, and the percentage of the polymeric material is from 12 wt % to 14 wt %. In another specific embodiment, the polymeric material is PVDF, the solvent is a combination of DMF and acetone, and the percentage of the polymeric material is 15 wt %.

In another specific embodiment, the polymeric material is Nylon-6,6, the solvent is a combination of formic acid and DCM, and the percentage of the polymeric material is from 12 wt % to 20 wt %. In another specific embodiment, the polymeric material is a combination of Nylon-6,6 and PA-6, 6, the solvent is formic acid, and the percentage of the polymeric material is 10 wt %. In another specific embodiment, the polymeric material is polyurethane, the solvent is dimethyl formamide, and the percentage of the polymeric material is 10 wt %.

In another specific embodiment, the polymeric material is polybenzimidazole, the solvent is dimethyl formamide, and the percentage of the polymeric material is 10 wt %. In another specific embodiment, the polymeric material is PBI, the solvent is dimethyl acetamide, and the percentage of the polymeric material is 10 wt %. In another specific embodiment, the polymeric material is polycarbonate, the solvent is a combination of dimethyl formamide and tetrahydrofuran, and the percentage of the polymeric material is 10 wt %. In another specific embodiment, the polymeric material is polycarbonate, the solvent is dichloromethane, and the percentage of the polymeric material is 15 wt %.

In another specific embodiment, the polymeric material is polyacrylonitrile, the solvent is dimethyl formamide, and the percentage of the polymeric material is 15 wt %. In another specific embodiment, the polymeric material is polyvinyl alcohol, the solvent is distilled water, and the percentage of the polymeric material is from 1-16 wt %. In another specific embodiment, the polymeric material is polylactic acid, the solvent is dichloromethane, and the percentage of the polymeric material is 5 wt %.

In another specific embodiment, the polymeric material is polyethylene oxide, the solvent is distilled water, and the percentage of the polymeric material is from 4-10 wt %. In another specific embodiment, the polymeric material is polyethylene terephthalate, the solvent is a combination of dichloromethane and trifluoracetic acid, and the percentage of the polymeric material is from 12-18 wt %. In another specific embodiment, the polymeric material is polystyrene, the solvent is tetrahydrofuran, and the percentage of the polymeric material is 25 wt %.

In another specific embodiment, the polymeric material is polyvinylphenol, the solvent is tetrahydrofuran, and the percentage of the polymeric material is from 20-60 wt %. In another specific embodiment, the polymeric material is polyvinylchloride, the solvent is a combination of tetrahydrofuran and dimethylformamide, and the percentage of the polymeric material is from 10-15 wt %. In another specific embodiment, the polymeric material is cellulose acetate, the solvent is a combination of acetone, acetic acid, and dimethylacetamide, and the percentage of the polymeric material is from 12.5-20 wt %.

In another specific embodiment, the polymeric material is poly(vinylidene fluoride), the solvent is a combination of dimethylformamide and dimethylacetamide, and the percentage of the polymeric material is 20 wt %. In another specific embodiment, the polymeric material is polyether imide, the solvent is hexafluoro-2-propanol, and the percentage of the polymeric material is 10 wt %. In another specific embodiment, the polymeric material is polyethylene glycol, the solvent is chloroform, and the percentage of the polymeric material is from 0.5-30 wt %. In another specific embodiment, the polymeric material is poly(ferrocenyldimethylsilane), the solvent is a combination of tetrahydrofuran and dimethylformamide, and the percentage of the polymeric material is 30 wt %.

In light of the foregoing, it should be appreciated that the present invention significantly advances the art by providing improved methods of forming dry adhesives from electrospinning spinnable materials and by providing dry adhesives with high shear adhesion strength and low normal detachment. In light of the foregoing, it should be appreciated that the present invention significantly advances the art by providing improved dry adhesives and associated methods of manufacture and use. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

Examples

For a fiber mat as described herein that was <100 microns thick, the following results were obtained:

| Water Beaker Testing (Dead Weight Test) (N/cm$^2$) | Dynamic Shear Testing (ASTM 1002D) (Size: 1.0 × 0.5 in; Speed: 0.02 in./min.) (N/cm$^2$) |
|---|---|
| 42.37 (Fibers on steel plate) | 21.24 ± 1.0 (Fibers on steel plate) |
| 50.07 (Fibers on glass plate) | 25.31 ± 2.2 (Fibers on glass plate) |
|  | 45.51 ± 2.9 (Self-Adhesion) |
|  | (Face stock tear occurred) |

Further Examples

With use of electrospun nylon 6 nanofiber membrane, dry adhesives are fabricated with high shear adhesion strength for strong shear binding-on but with substantial normal detachment strength (V) for easy normal lifting-off. With the aid of microscopy and microanalyses, the effects of the fiber diameter, fiber surface roughness, and thickness of membrane on their corresponding adhesion strengths are investigated. It is found that the stiffness of fiber fabrics and dimensional characteristics play a critical role in optimizing the van der Waals interactions and thus the shear adhesion strength between electrospun nylon 6 and surface asperities.

Collection of Aligned Electrospun Fibers

Nylon 6 pellets (Sigma Aldrich, CAS 25038-54-4) are dissolved in formic acid (EMD Corporation, CAS 64-18-6) and magnetically stirred overnight. A syringe pump is employed for maintaining a solution drop on the tip of a stainless steel needle (Gauge 24). The latter needle is attached to a 5 mL capacity syringe filled with the solution. The needle is charged with a high voltage of 25 kV. The gap distance between the tip of the needle and the top of the rotating disc collector is set to be 150 mm. The collector has a diameter of 150 mm and electrospun fibers are collected at take-up velocity of 20 m/s.

Fabrication of High AR Nanofiber Membrane

After collecting electrospun fibers for 10 minutes, a portion of the membrane is discarded to prepare the surface of the collector for peeling. A small part of the membrane is then placed on a glass slide using the tapered tip of a needle. The glass slide is thereafter rotated in the plane where membranes overlap one another. Subsequently, membranes with substantial thickness are obtained. These membranes are then installed in a holder.

Atomic Force Microscopy (AFM)

Contact-mode AFM is performed for investigating the elastic modulus of fiber E. A contact-mode probe (Veeco Inc.), with a tip radius of 12 nm and a cantilever spring constant of 0.125 N/m, is employed. The diameter and surface roughness of fibers are determined using tapping-mode AFM. A tapping-mode probe (MikroMasch Inc.), with a tip radius of 10 nm and a cantilever spring constant of 40 N/m, is employed. Scanning is done at a frequency of 0.5 Hz and data are analyzed by employing SP13800N probe station software (Seiko, Inc.). Surface roughness of the nanofiber is obtained by tracing a line along the fiber axis. An average roughness of the fiber surface is determined.

Macroscopic Adhesion Testing

Nanofiber membrane is finger-pressed on a glass slide and then the weight is added to the end of the line. The weight consists of a beaker which is incrementally filled with water until membranes get separated from the glass slide. The contact area between membrane and a glass slide has a width and a length of 3 mm and 2 mm, respectively. The only two parameters which vary are membrane thickness and nanofiber diameter. No external normal load is applied to the membrane while being tested.

Effects of Membrane Thickness (T) on Shear Adhesion

Figure 14A:
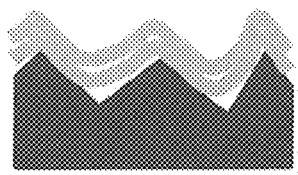
FIG. 14A generally shows nanofibrous membranes studied at section A of FIG. 14, showing considerable flexibility with a weak tensile strength for T less than 12 μm.
Figure 14B:
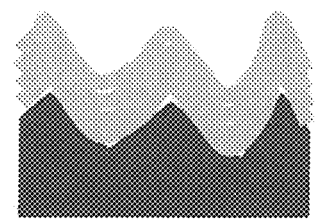
FIG. 14B generally shows nanofibrous membranes studied at section B of FIG. 14, showing that flexibility and tensile strength of membranes reach optimum performances for T between 30 and 40 μm.
Figure 14C:
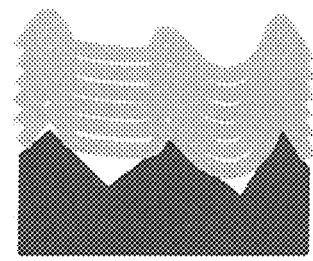
FIG. 14C generally shows nanofibrous membranes studied at section C of FIG. 14 and that these nanofibrous membranes start losing their flexibility for T greater than 40 μm.

As shown in FIG. 14, nanofiber membrane displays low shear adhesion strengths for T less than 12 µm. However, for T ranging between 15 µm and 40 µm, the shear adhesion strength of nanofiber arrays substantially increases with rising T and reaches peak values. For T greater than 40 µm, the shear adhesion strength of the membrane is significantly reduced with increasing T and reaches considerably low values above T of 80 µm. Shear adhesion testing is performed at an angle θ of 0° with the glass slide. The highest shear adhesion strength of 27 N/cm$^2$ is reached for membranes having fibers with d of 50 nm and T of 30-40 µm. A glass beaker is filled with water (total weight of 170 g, shear adhesion strength of 28.3 N/cm$^2$) and carried by a small piece of membrane (3 mm by 2 mm). This shear adhesion strength is 415% greater than the one reported for PC nanofiber-based dry adhesives. As shown in FIG. 14A, nanofibrous membranes may be considerably flexible with a weak tensile strength for T less than 12 µm. Subsequently, these membranes are expected to retain a minimal real contact area with a substrate. Thus, the latter membranes have limited van der Waals (vdW) interactions and hence could not carry a heavy load. Nevertheless, as presented in FIG. 14B, it is suggested that the flexibility and tensile strength of membranes reach optimum performances for T between 30 and 40 µm. Thus, membranes retain a significant real contact area with the glass substrate during loading, which leads to a substantial shear adhesion strength. However, as shown in FIG. 14C, it is proposed that nanofibrous membranes start losing their flexibility for T greater than 40 µm. This phenomenon causes an extensive decrease in the real contact area between the fibers and the glass slide leading to deteriorating shear adhesion strength.

Figure 18:
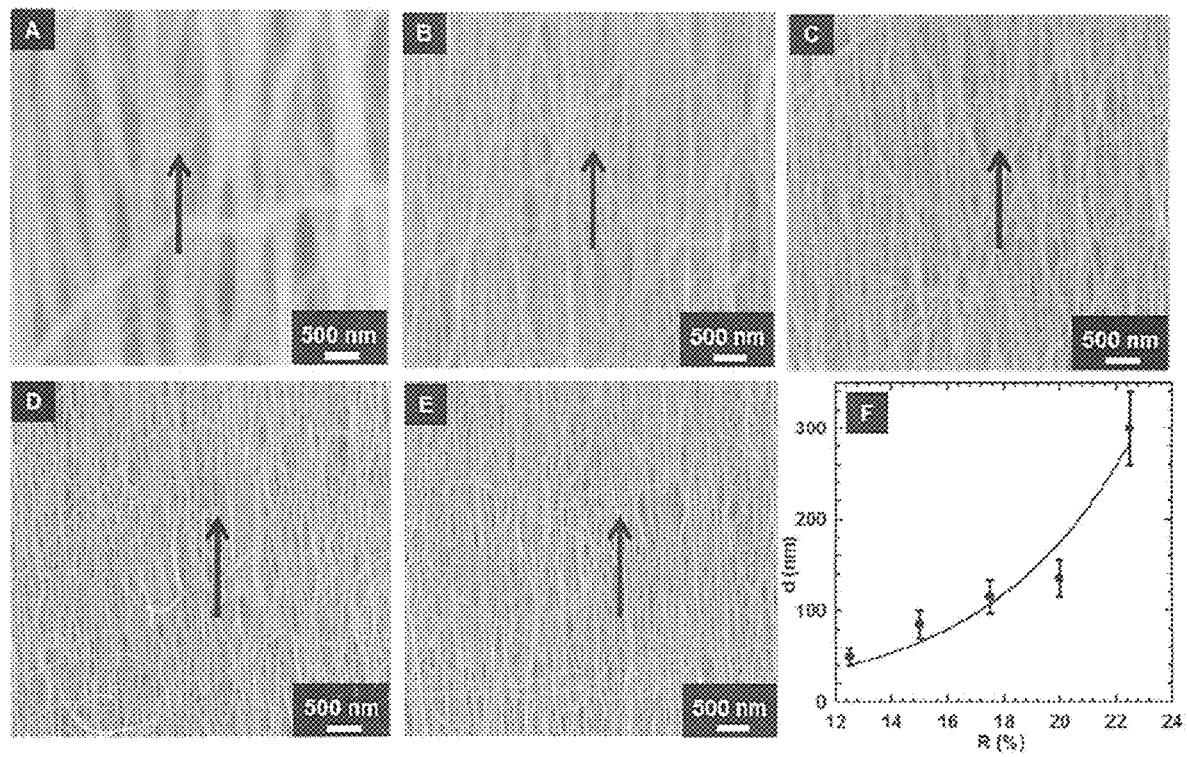
FIG. 18, at "A" through "E" are scanning electron microscopy (SEM) images of electrospun nylon 6 fibers with different d's (300 nm, 135 nm, 115 nm, 85 nm, and 50 nm, respectively), and at "F" is a graph showing d as a function of R.

Effects of Fiber Packing Density, Nanofiber Diameter (d) and Fiber Surface Roughness on Adhesion As shown in FIG. 18 ("A"-"E"), the packing density and aspect ratio of fibers are both noticeably enhanced with decreasing d. This enhancement is suggested to augment vdW interactions between the fibers and the substrate leading to an upsurge in shear adhesion strength. As shown in FIG. 18, "F," d extensively diminishes with decreasing concentration of polymer solution (R). The fiber packing density is characterized via SEM (FEI Quanta 200). Theoretical studies have shown that significant adhesion could be obtained by size reduction. Furthermore, the side contact of fibers with a substrate over a large contact area causes significant adhesion.

Surface boundary of fibers also makes contribution to the shear adhesion. For side wall contacts of fibers, the attractive force per unit length between the nanofiber and substrate is:

$$F_v = A\sqrt{d}/(16D^{2.5})$$

where A is the Hamaker constant, and D the gap distance between the surface of the nanofiber and the substrate. There exists a cut-off gap distance $D=D_0$ which represents the effective separation between the nanofiber and substrate and at which the maximum Fv (FvM) is estimated. The total FvM is:

$$F_{vMK} = NLA\sqrt{d}/(16D_0^{2.5})$$

where N represents the total number of fibers along the contact width between the nanofiber arrays and the substrate (W) and is N=W/d. Replacing the value of N in the previous equation, we obtain:

$$F_{vMK}=LWA/(16D_0^{2.5}\sqrt{d})$$

For constant values of W and the contact length between the nanofiber arrays and the substrate (L), FvMK radically increases with decreasing d. These results suggest a substantial increase in the shear adhesion strength with diminishing d.

Figure 19:
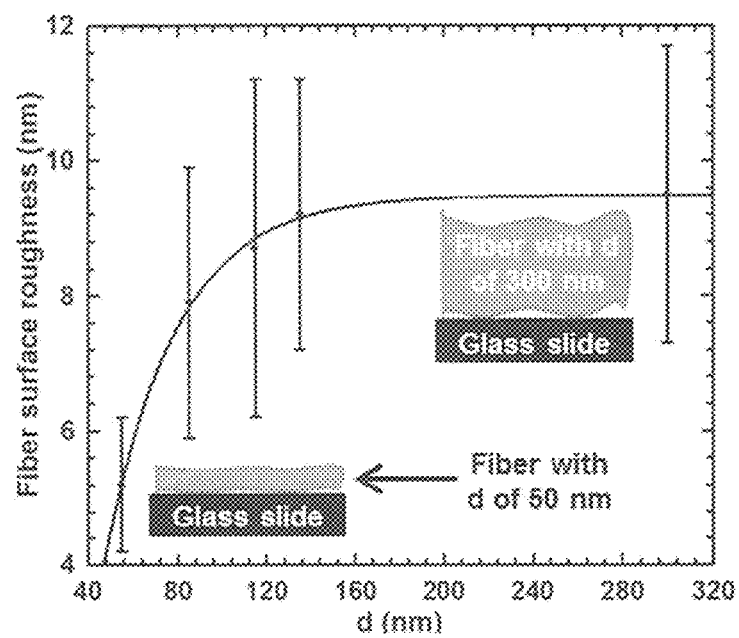
FIG. 19 is a graph showing the surface roughness of a nanofiber as a function of d.

As shown in FIG. 19, the surface roughness of fibers considerably diminishes with decreasing d. The latter decrease leads to a significant enhancement in shear adhesion strength between membrane and a substrate due to a considerable proliferation in the effective contact area.

Normal Adhesion Force

Membranes are easily peeled off a glass slide for θ=90°. For a contact area of 3×2 mm² with a glass slide, the normal adhesion force of the membranes is roughly 0.015 N, regardless of d and T. Meanwhile, the maximum shear adhesion force for nanofiber arrays is 1.6 N (Fibers with d of 50 nm) which leads to a V=100. Thus, these nylon 6 fiber membranes are 10 times easier to detach from a glass slide in the normal direction dry adhesives. This significant V value is suggested to be due to the high AR of the nanofibers. Thus, a significant decrease in the effective contact area between the nanofibers and the substrate arises during vertical detachment, which leads to an easy normal lifting-off.

Effect of Nanofiber Bending Stiffness on Adhesion

Figure 20:
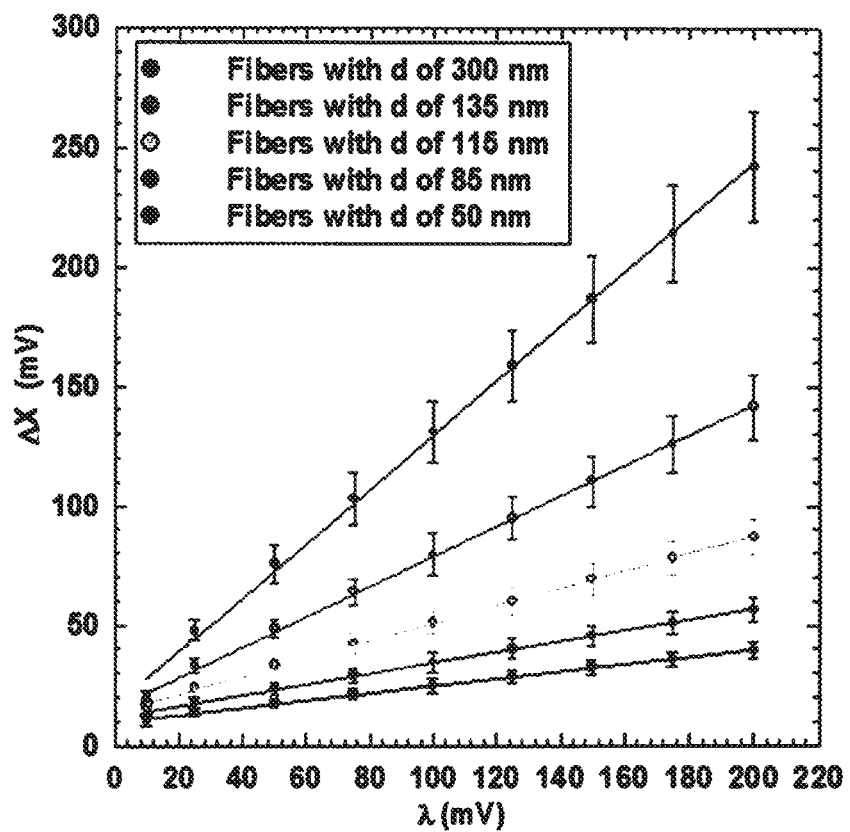
FIG. 20 is a graph showing ΔX as a function of λ for fibers with varying d.

The bending stiffness of a nanofiber is b=EI where I is the moment of inertia of the cross section of a nanofiber. The indentation of a cantilever tip into the nanofiber is directly proportional to lateral deflection of the cantilever (ΔX). According to the Hertz model, ΔX is defined as:

$$h=[2(1-v^2)f/4a^{0.5}E]^{2/3}$$

where a is the AFM probe tip radius, v the Poisson's ratio of the tested material, and f the applied normal load on a fiber. f is directly proportional to a sinusoidal drive signal (λ). As shown in FIG. 20, ΔX continuously rises with increasing λ. Fibers with d of 300 nm display the largest slope (P). Fibers with d of 50 nm possess the smallest P where the latter is directly proportional to E. P of fibers with d of 300 nm ($P_0$) is taken as a reference value for determining the relative modulus of a fiber:

$$E_r=P/P_0$$

Figure 21A:
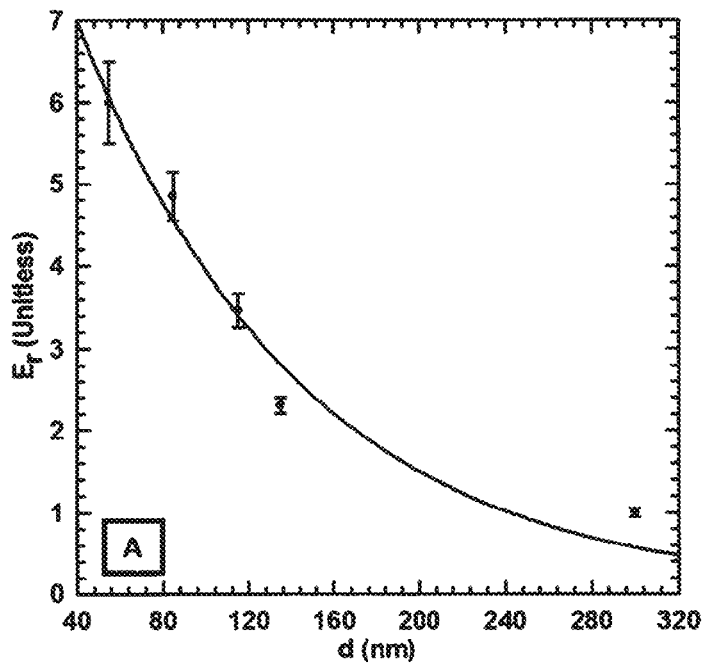
FIG. 21A is a graph showing $E_r$ as a function of d.

As shown in FIG. 21A, Er for fibers with d of 50 nm is 6-fold above the one for fibers with d of 300 nm. This upsurge is mainly caused by the increase in molecular orientation during electrospinning and nanofiber collection when d diminishes. Thus, it becomes more difficult for the tip of an AFM probe to penetrate deeper in the polymer chains of a fiber leading to a smaller ΔX value for a specific X value. Assuming that a nanofiber has a circular cross section:

$$I=\pi d^4/64$$

The relative moment of inertia is:

$$I_r=I/I_0=(d/d_0)^4$$

Where $d_0$ is 300 nm and $I_0$ is I for $d_0$. The relative bending stiffness is:

$$b_r=E_r I_r$$

and thus:

$$b_r=E_r(d/d_0)^4$$

Figure 21B:
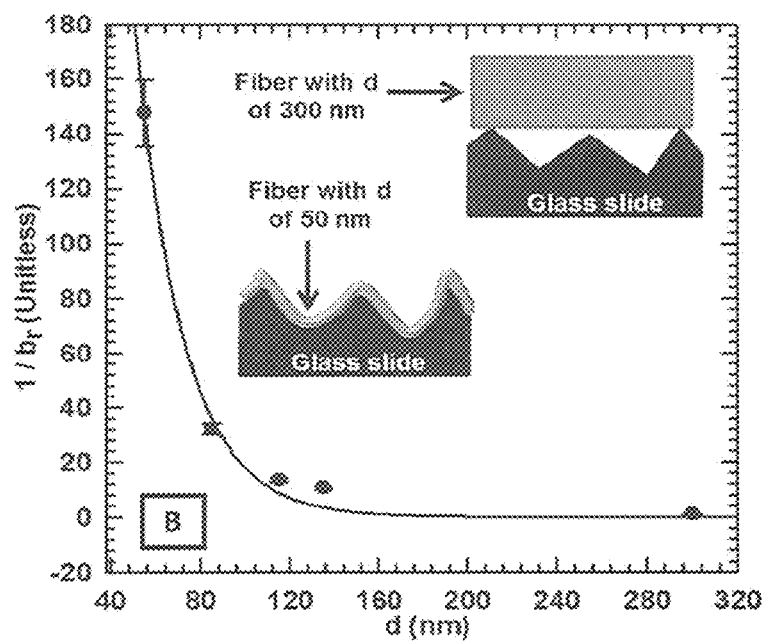
FIG. 21B is a graph showing $1/b_r$ as a function of d.

As shown in FIG. 21B, $1/b_r$ significantly rises with decreasing d for fibers with d less than 120 nm. Fibers with d of 50 nm are 150 times more flexible than the ones with d of 300 nm. As shown in insets of FIG. 21B, this noteworthy flexibility is suggested to cause a substantial enhancement in the real contact area between a nanofiber and a glass slide. This enhancement could play a critical role to significantly increase the shear adhesion strength between a nanofiber and a glass slide.

The forgoing provides a technique for fabricating electrically insulating dry adhesives from electrospun nylon 6 nanofibers. These adhesives possess shear adhesion strength as high as 27 N/cm² on a glass slide. This measured value is 97-fold above normal adhesion strength of the same adhesive. For a definite d, the shear adhesion strength of membranes reaches optimum values for a specific range of array thicknesses while deteriorating otherwise. These optimum values suggest that these arrays could retain a significant real contact area with the substrate during loading. Fiber bending stiffness and fiber packing density are significantly increased with decreasing d while fiber surface roughness is noticeably reduced. These enhancements are proposed to considerably increase the shear adhesion strength between a nanofibrous membrane and a glass slide. The drastic increase is mainly attributed to a sizeable proliferation in van der Waal forces with enhanced contact area. This finding enables the creation of electrically insulating dry adhesives with a strong shear adhesion and relatively weak normal adhesion for easy detachment.

Various modifications and alterations that do not depart from the scope and spirit of this invention will become apparent to those skilled in the art. This invention is not to be duly limited to the illustrative embodiments set forth herein.

What is claimed is:

1. A dry adhesive comprising:
a non-woven fabric of overlapping electrospun nanofibers comprising a polymeric material, the nanofibers comprising an average diameter within a range of from 50 nm to 10000 nm, and the non-woven fabric of nanofibers having a sheet-like form and comprising a thickness within a range of from 0.1 µm to 100 µm;
wherein, the dry adhesive is removable and reusable, and has a shear adhesion strength when applied to a glass slide that is higher than a normal adhesion strength of the dry adhesive when applied to the glass slide, the normal adhesion strength being the adhesive strength measured in a direction that is generally perpendicular with a surface of the non-woven fabric applied to the glass slide, and
wherein, at least 70 percent of the nanofibers are substantially aligned.

2. The dry adhesive of claim 1, wherein
the nanofibers extend from and are supported by a polycarbonate base, the nanofibers forming a hierarchical structure.

3. The dry adhesive of claim 1, wherein
the thickness of the non-woven fabric of nanofibers is within a range of from 15 µm to 40 µm.

4. The dry adhesive of claim 1, wherein
the polymeric material comprises material selected from the group consisting of polyurethanes (PU), polycaprolactones (PCL), polyvinyl alcohols (PVA), poly(vinylidene fluoride)s (PVDF), polyamides (PA), polybenzimidazoles (PBI), polycarbonates (PC), polyacrylonitriles (PAN), polylactic acids (PLA), polyethylene oxides (PEO) and polyethylene glycols (PEG), polyethylene terephthalates (PET), polystyrenes (PS), polyvinylphenols (PVP), polyvinylchlorides (PVC), cellulose acetates (CA), polyether imides (PEI), poly(ferrocenyldimethylsilane)s (PFDMS), polyvinylpyrrolidone, polytetrafluoroethylene, polynorbornene, polysulfone, polyether ether ketone, polyacrylates including poly(methyl methacrylate) (PMMA), 2-hydroxyethyl methacrylate (PHEMA), poly(glycidyl methacrylate), poly(2-dimethylamino ethylmethacrylate) (PDMAEMA), poly(2-methacryloyloxyethyl phosphorylcholine), polyacrylamides including poly(N-isopropylacrylamide) (PNIPAM) and poly(N, N-dimethyl acrylamide) (PDMA), and mixtures thereof.

5. The dry adhesive of claim 1, wherein
the polymeric material comprises material selected from the group consisting of polyvinyl alcohols, poly(vinylidene fluoride)s (PVDF), polyvinylphenols (PVP), polyvinylchlorides (PVC), polyvinylpyrrolidone, and polyacrylates including poly(methyl methacrylate) (PMMA), 2-hydroxyethyl methacrylate (PHEMA), poly(glycidyl methacrylate), poly(2-dimethylamino ethylmethacrylate) (PDMAEMA), poly(2-methacryloyloxyethyl phosphorylcholine), and mixtures thereof.

6. The dry adhesive of claim 1, wherein
the polymeric material comprises material selected from the group consisting of styrene block copolymers (SBC), styrene-butadiene-styrene (SBS), styrene-ethylene/butylene-styrene (SEBS), styrene-ethylene/propylene (SEP), styrene-isoprene-styrene (SIS), and mixtures thereof.

7. The dry adhesive of claim 6, wherein
the polymeric material further comprises poly(methyl methacrylate) (PMMA).

8. The dry adhesive of claim 1, wherein
the non-woven fabric of nanofibers further comprises a surface and microprotusions on the surface.

9. The dry adhesive of claim 1, wherein
the non-woven fabric of nanofibers further comprises a tackifier.

10. The dry adhesive of claim 1, wherein
the nanofibers lie lengthwise parallel to a primary surface of the non-woven fabric.

11. The dry adhesive of claim 1, wherein
at least 80 percent of the nanofibers extend at an angle that is +/−10 degrees from a reference angle.

12. The dry adhesive of claim 1, wherein
according to a distribution graph, with (i) an x-axis associated with an angle of alignment of the nanofibers and (ii) a y-axis associated with normalized intensity, generated from a 2-dimensional fast Fourier transform analysis of a scanning electron microscope image of the nanofibers, at least 70 percent of an area of under a curve of normalized intensity as a function of angle of alignment is between the angles of alignment of 80 degrees to 100 degrees, where 90 degrees is a reference angle of alignment.

13. The dry adhesive of claim 1 further comprising:
a face stock on which the nanofibers are disposed, the nanofibers covering at least 70 percent of a surface area of the face stock.

14. The dry adhesive of claim 13, wherein
the shear adhesion strength of the dry adhesive is greater than a tear strength of the face stock, such that the face stock exhibits a failure before the dry adhesive exhibits a failure of shear adhesion.

15. A dry adhesive comprising:
a non-woven fabric of randomly oriented electrospun nanofibers comprising a polymeric material, the non-woven fabric of nanofibers comprising a thickness within a range of from 0.1 µm to 100 µm;
wherein, the dry adhesive is removable and reusable, and has a shear adhesion strength when applied to a glass slide that is higher than a normal adhesion strength of the dry adhesive when applied to the glass slide, the normal adhesion strength being the adhesive strength measured in a direction that is generally perpendicular with a surface of the non-woven fabric applied to the glass slide.

16. The dry adhesive of claim 15, wherein
the thickness of the non-woven fabric of nanofibers is within a range of from 15 µm to 40 µm.

17. The dry adhesive of claim 15, wherein
the polymeric material comprises material selected from the group consisting of polyurethanes (PU), polycaprolactones (PCL), polyvinyl alcohols (PVA), poly(vinylidene fluoride)s (PVDF), polyamides (PA), polybenzimidazoles (PBI), polycarbonates (PC), polyacrylonitriles (PAN), polylactic acids (PLA), polyethylene oxides (PEO) and polyethylene glycols (PEG), polyethylene terephthalates (PET), polystyrenes (PS), polyvinylphenols (PVP), polyvinylchlorides (PVC), cellulose acetates (CA), polyether imides (PEI), poly(ferrocenyldimethylsilane)s (PFDMS), polyvinylpyrrolidone, polytetrafluoroethylene, polynorbornene, polysulfone, polyether ether ketone, polyacrylates including poly(methyl methacrylate) (PMMA), 2-hydroxyethyl methacrylate (PHEMA), poly(glycidyl methacrylate), poly(2-dimethylamino ethylmethacrylate) (PDMAEMA), poly(2-methacryloyloxyethyl phosphorylcholine), polyacrylamides including poly(N-isopropylacrylamide) (PNIPAM) and poly(N, N-dimethyl acrylamide) (PDMA), and mixtures thereof.

18. The dry adhesive of claim 15, wherein the polymeric material comprises material selected from the group consisting of styrene block copolymers (SBC), styrene-butadiene-styrene (SBS), styrene-ethylene/butylene-styrene (SEBS), styrene-ethylene/propylene (SEP), styrene-isoprene-styrene (SIS), and mixtures thereof.

* * * * *